United States Patent
Paul

(10) Patent No.: US 11,256,402 B1
(45) Date of Patent: Feb. 22, 2022

(54) SYSTEMS AND METHODS FOR GENERATING AND BROADCASTING DIGITAL TRAILS OF VISUAL MEDIA

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/991,514

(22) Filed: Aug. 12, 2020

(51) Int. Cl.
- *G06F 3/0482* (2013.01)
- *G06F 3/04845* (2022.01)
- *G06T 11/60* (2006.01)

(52) U.S. Cl.
CPC ........ *G06F 3/04845* (2013.01); *G06F 3/0482* (2013.01); *G06T 11/60* (2013.01); *G06T 2200/24* (2013.01)

(58) Field of Classification Search
CPC ................................................ G06F 3/048–05
See application file for complete search history.

(56) References Cited

U.S. PATENT DOCUMENTS

| | | | |
|---|---|---|---|
| 8,943,140 B1 * | 1/2015 | Kothari | G06Q 10/1095 709/204 |
| 9,003,306 B2 * | 4/2015 | Mehin | H04L 51/36 715/758 |
| 9,634,855 B2 * | 4/2017 | Poltorak | G06K 9/00302 |
| 9,639,969 B1 * | 5/2017 | Wilson | H04L 51/32 |
| 9,934,772 B1 | 4/2018 | Yoelin | |
| 10,374,994 B1 | 8/2019 | Viklund et al. | |
| 10,656,797 B1 | 5/2020 | Alvi et al. | |
| 10,693,819 B1 | 6/2020 | Boyd et al. | |
| 10,803,120 B1 | 10/2020 | Hu et al. | |
| 2002/0065848 A1 * | 5/2002 | Walker | G06F 40/166 715/205 |
| 2006/0248105 A1 | 11/2006 | Goradia | |
| 2008/0098005 A1 | 4/2008 | Goradia | |
| 2009/0258710 A1 | 10/2009 | Quatrochi et al. | |
| 2010/0070878 A1 * | 3/2010 | Amento | H04N 21/4788 715/751 |

(Continued)

OTHER PUBLICATIONS

Drawception.com, "Drawceptoin", available at <<https://drawception.com/>>, archived on Aug. 3, 2019 at wayback machine: <<https://web.archive.org/>>, 2 pages. (Year: 2019).*

(Continued)

*Primary Examiner* — Daniel Rodriguez
(74) *Attorney, Agent, or Firm* — FisherBroyles, LLP

(57) ABSTRACT

A computer-implemented method for generating and broadcasting digital trails of visual media may include (i) receiving user input initiating a digital trail, the user input including a selection of a trail mode from a list of candidate modes, (ii) creating a digital trail container configured to contain a series of thematically related visual media works generated by users invited to contribute to the digital trail, (iii) providing, to one or more users, a creation prompt that corresponds to the trail mode, (iv) adding, to the digital trail container, at least one visual media work received in response to providing the creation prompt, and (v) displaying the resulting digital trail by sequentially presenting each visual media work added to the digital trail container in the order added. Various other methods, systems, and computer-readable media are also disclosed.

20 Claims, 12 Drawing Sheets

(56) References Cited

U.S. PATENT DOCUMENTS

| | | | |
|---|---|---|---|
| 2011/0214044 A1* | 9/2011 | Davis | G06T 11/80 |
| | | | 715/201 |
| 2011/0224000 A1 | 9/2011 | Toga et al. | |
| 2012/0096410 A1* | 4/2012 | Lancaster | G06F 3/0482 |
| | | | 715/854 |
| 2012/0165100 A1 | 6/2012 | Lalancette et al. | |
| 2013/0179805 A1* | 7/2013 | Wyser | G06F 3/0483 |
| | | | 715/759 |
| 2013/0311947 A1* | 11/2013 | Tsai | G09B 5/10 |
| | | | 715/815 |
| 2014/0045590 A1* | 2/2014 | Smith-Stout | A63F 13/00 |
| | | | 463/31 |
| 2014/0096167 A1* | 4/2014 | Lang | H04N 21/4223 |
| | | | 725/91 |
| 2014/0143312 A1* | 5/2014 | Stockton | G06Q 50/01 |
| | | | 709/203 |
| 2014/0223318 A1* | 8/2014 | Pefferle | H04N 1/00159 |
| | | | 715/738 |
| 2014/0282080 A1 | 9/2014 | Garner | |
| 2014/0328574 A1 | 11/2014 | Sandberg et al. | |
| 2015/0006369 A1 | 1/2015 | Soroka | |
| 2015/0012531 A1* | 1/2015 | Armstrong | G06Q 50/00 |
| | | | 707/733 |
| 2015/0120308 A1 | 4/2015 | Leistikow et al. | |
| 2015/0172069 A1 | 6/2015 | Lin et al. | |
| 2015/0242514 A1* | 8/2015 | Simon | G06Q 50/01 |
| | | | 715/739 |
| 2016/0018886 A1* | 1/2016 | Song | A63F 13/213 |
| | | | 715/757 |
| 2016/0048989 A1* | 2/2016 | Gabbidon | H04L 67/10 |
| | | | 715/716 |
| 2016/0156874 A1* | 6/2016 | Rajagopalan | H04L 67/04 |
| | | | 348/207.1 |
| 2016/0188153 A1 | 6/2016 | Lerner et al. | |
| 2016/0283456 A1* | 9/2016 | Sitrick | H04L 51/04 |
| 2016/0357720 A1* | 12/2016 | Thimbleby | G06F 3/0484 |
| 2017/0093780 A1* | 3/2017 | Lieb | G06T 3/40 |
| 2017/0208362 A1 | 7/2017 | Flores et al. | |
| 2018/0025004 A1 | 1/2018 | Koenig | |
| 2018/0095616 A1* | 4/2018 | Valdivia | G06F 3/013 |
| 2018/0109479 A1* | 4/2018 | Bahk | H04M 1/72439 |
| 2018/0139157 A1* | 5/2018 | Deculus | H04L 51/063 |
| 2018/0158441 A1 | 6/2018 | Zhao et al. | |
| 2018/0167427 A1* | 6/2018 | Kedenburg, III | H04L 65/602 |
| 2018/0234738 A1 | 8/2018 | Sarkar et al. | |
| 2018/0308462 A1 | 10/2018 | Wang | |
| 2018/0336716 A1* | 11/2018 | Ramprashad | G06F 3/0484 |
| 2019/0066730 A1 | 2/2019 | Singh et al. | |
| 2019/0079659 A1* | 3/2019 | Adenwala | H04W 4/026 |
| 2019/0087000 A1 | 3/2019 | Ricknäs et al. | |
| 2019/0138165 A1* | 5/2019 | Siddhantam | G06F 3/0482 |
| 2019/0244639 A1 | 8/2019 | Benedetto | |
| 2019/0250784 A1* | 8/2019 | Bodamer | H04L 67/2842 |
| 2019/0259360 A1 | 8/2019 | Yoelin | |
| 2019/0342240 A1* | 11/2019 | Garrido | H04M 1/72439 |
| 2019/0355337 A1 | 11/2019 | Steinwedel et al. | |
| 2019/0385411 A1 | 12/2019 | Lucas | |
| 2020/0242182 A1* | 7/2020 | Gokyigit | G06F 3/0482 |
| 2020/0259876 A1 | 8/2020 | Evans | |
| 2020/0333949 A1* | 10/2020 | Lim | G06F 3/0412 |
| 2020/0401306 A1* | 12/2020 | Angelov | G06F 3/0414 |

OTHER PUBLICATIONS wikihow.com, "How to Play Draw Something", available at <<https://www.wikihow.com/Play-Draw-Something>>, archived on Apr. 14, 2012 at wayback machine: <<https://web.archive.org/>>, 4 pages. (Year: 2012).*

Natasha Lomas, "Now There's Not One, But Two Emoji-Only Social Networks", posted Aug. 4, 2014, available at <<https://techcrunch.com/2014/08/04/emoji-only/?guccounter=1&guce_referrer=aHR0cHM6Ly93d3cuZ29vZ2xlLmNvbvb (Year: 2014).*

Item W Continued: S8&guce_referrer_sig=AQAAACKbWwykXNSM4TmFcFEFb5EZILMxewjJ4lASmnxjGtvZoy7n_vJQalqQHrpFjHJ2e>>, 13 pages. (Year: 2014).*

Swarmsketch.com, "Welcome to SwarmSketch", available at <<https://swarmsketch.com>>, archive one Aug. 6, 2019 at wayback machine: <<https://web.archive.org/>>, 2 pages. (Year: 2019).*

Paul, Debashish, "Systems and Methods for Maintaining a Digital Trail Framework", U.S. Appl. No. 16/991,525, filed Aug. 12, 2020, 140 pages.

Paul, Debashish, "Systems and Methods for Generating and Broadcasting Digital Trails of Recorded Media", U.S. Appl. No. 16/991,521, filed Aug. 12, 2020, 91 pages.

Paul, Debashish, "Display Screen With a Graphical User Interface", U.S. Appl. No. 29/746,199, filed Aug. 12, 2020, 14 pages.

Paul, Debashish, "Display Screen With a Graphical User Interface", U.S. Appl. No. 29/746,197, filed Aug. 12, 2020, 12 pages.

Non-Final Office Action received for U.S. Appl. No. 16/991,521 dated Dec. 8, 2020, 73 pages.

Nelson Jr., Keith, "Rhymes With Reason uses Kendrick Lamar and Drake lyrics to teach kids vocabulary", URL: https://www.revolt.tv/2019/7/8/20839030/rhymes-with-reason-uses-kendrick-lamar-and-drake-lyrics-to-teach-kids-vocabulary, Jul. 8, 2019, 11 pages.

"Use my last word . . . first. (word game)", URL: https://emotivalounge.proboards.com/thread/14465/use-last-word-first-game?page%5Cu003d932&page=346, The Emotive Lounge, Apr. 3, 2013, 11 pages.

"Parents' Ultimate Guide to TikTok", URL: https://www.commonsensemedia.org/blog/parents-ultimate-guide-to-tiktok#:~:text=TikTok%20is%20a%20social%20network,lip%2Dsynching%20to%20popular%20songs.&text=Users%20can%20create%20and%20upload,topics%2C%20songs%2C%20and%20styles, Common Sense Media, last accessed at Jun. 9, 2020, 28 pages.

Notice of Allowance received for U.S. Appl. No. 16/991,521 dated Apr. 20, 2021, 36 pages.

* cited by examiner

SYSTEMS AND METHODS FOR GENERATING AND BROADCASTING DIGITAL TRAILS OF VISUAL MEDIA

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
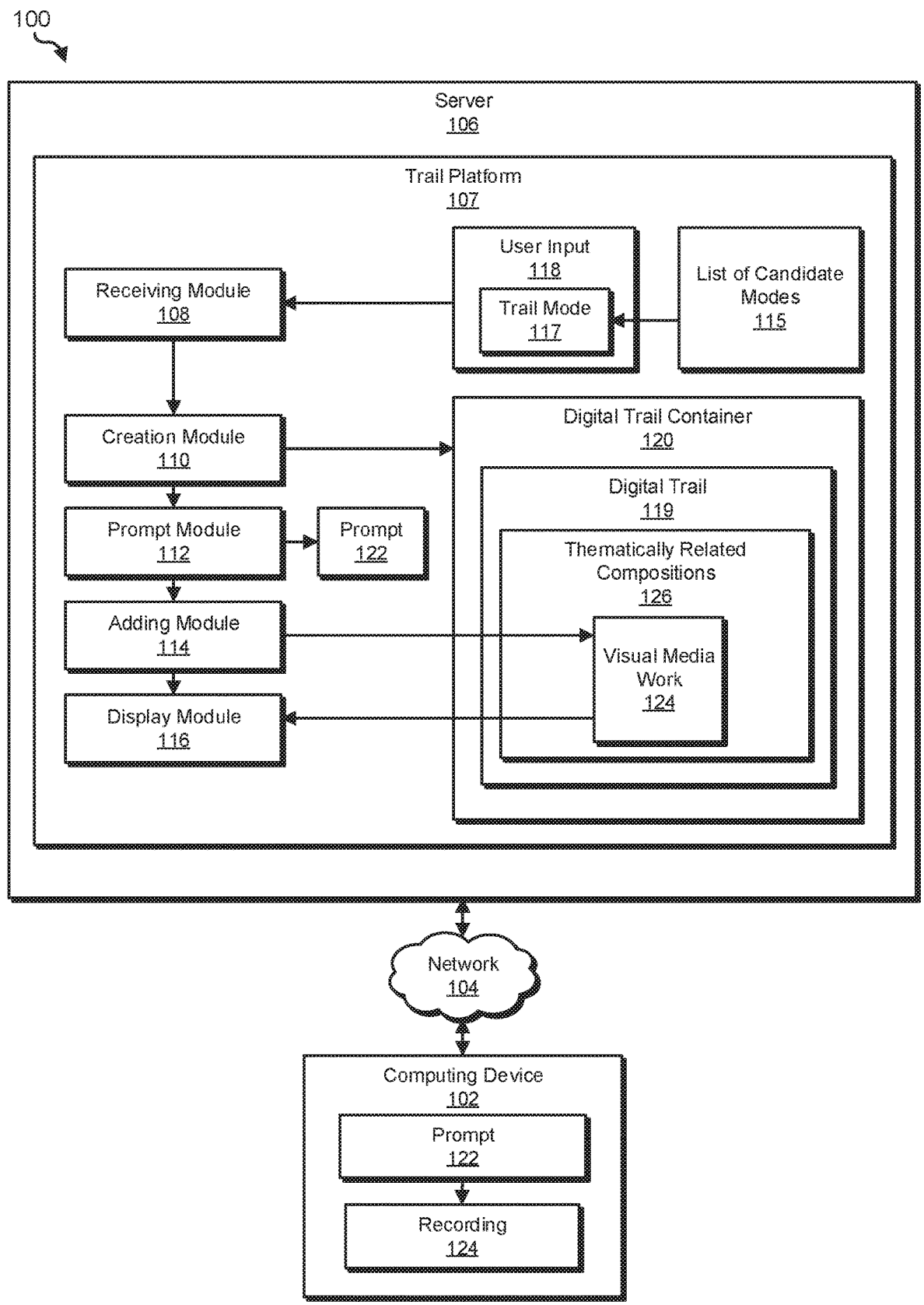
FIG. 1 is a block diagram of an exemplary system for generating and broadcasting digital trails of visual media.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for creating non-ephemeral series of linked compositions of user-generated content (i.e., trails) with visual compositions created by users. In some embodiments, the systems described herein may support multiple different visual-composition-based modes for trails. Such modes may include a question-and-answer mode, a doodle face mode, a collaborative drawing mode, an animation response mode, and a photo challenge mode.

In the question-and-answer mode, each composition within a trail may respond to a question selected by a trail initiator (e.g., from a list of preprogrammed questions) and may satisfy composition constraints set by the trail initiator. In the collaborative drawing mode, each composition within a trail may represent a composition of a drawing that adds on to a drawing completed in a previous composition immediately preceding the composition within the trail. In the doodle face mode, each composition within a trail may include (1) a "doodle face" (a graphic of a face) and a word-based sound bite selected by a trail initiator and (2) an image selected by the user creating the composition, with the doodle face positioned in a location within the image selected by the user.

In the animation response mode, each composition within a trail may be based on an animation (e.g., a subtitled animation) and may reply to a previous animation-based composition immediately preceding the composition within the trail. Finally, in the photo challenge mode, each composition within a trail may represent a photograph that satisfies criteria selected by the trail initiator. In some embodiments, the systems described herein may facilitate the creation of any kind of trail that involves user-created visual compositions.

As will be explained in greater detail below, embodiments of the instant disclosure may automate portions of a group composition process, thereby eliminating the need for trail participants to manually edit the recorded segments into a cohesive whole. An automated group editing process may be particularly useful to groups of individuals who may not be able to physical interact with each other, enabling them to easily create group compositions without the need to be physically present in the same room. The systems and methods described herein may improve the functioning of a computer itself by improving the computer's ability to provide compiled digital trails based on user input and further enable computers to provide community-oriented interactions centered around group compositions of visual media. Trail platforms may additionally improve the functioning of privacy controls on social media sites by enabling individual contributors to a group composition to selectively manage their own segment independently from other segments in the trail.

The systems described herein may be implemented in a variety of ways. FIG. 1 is a block diagram of an exemplary system 100 for generating and broadcasting digital trails of visual media. In one embodiment, and as will be described in greater detail below, a server 106 may be configured with a receiving module 108 that may receive user input 118 initiating a digital trail 119. In some examples, user input 118 may include a selection of a trail mode 117 from a list of candidate modes 115. In response to user input 118, a creation module 110 may create a digital trail container 120 configured to contain a series of thematically related compositions 126 generated by users invited to contribute to the digital trail. A prompt module 112 may provide, to one or more users, a prompt 122 that corresponds to the trail mode. After prompt module 112 provides prompt 122, an adding module 114 may add, to digital trail container 120, a visual media work 124 received in response to providing prompt 122. Display module 116 may display the resulting digital trail by sequentially presenting each visual media work of thematically related compositions 126 added to digital trail container 120 in the order added.

In some embodiments, some or all of the previously described modules may be hosted on server 106. Although illustrated as a single element, server 106 may broadly represent any physical or virtual server and/or group of physical and/or virtual servers connected by one or more networks. In some embodiments, server 106 may communicate with a computing device 102 via a network 104. In one embodiment, computing device 102 may represent a personal computing device operated by a user, such as a mobile phone, tablet, or laptop. In some examples, the systems described herein may present prompt 122 via computing device 102 and/or receive visual media work 124 via computing device 102.

In some examples, server 106 may perform social networking functions in conjunction with a social media service. In these examples, a user of computing device 102 may be a member of the social media service and computing device 102 may have installed an instance of a social media application that operates as part of the social media service. Additionally or alternatively, computing device 102 may have installed a browser that may navigate to one or more webpages maintained by the social media service.

A social media service may generally include any type or form of social media platform, or collection of social media platforms, provided via server 106 to enable digital social networking. In some examples, a social media service may include a variety of different platforms (e.g., frameworks) for the users within its network. For example, a social media service may provide one or more status-broadcasting platforms, such as a newsfeed platform and/or a stories platform, that enables users to broadcast, consume, and/or digitally respond to user-generated compositions. Additionally or alternatively, a social media service may provide a messaging platform that enables users to send private messages and/or a trail platform 107 that enables the creation and sharing of linearly linked group compositions.

In some examples, a newsfeed platform may provide users with a newsfeed and/or enable users to create and/or post newsfeed compositions. The term "newsfeed" may generally refer to any type or form of social media consumption channel that presents a scrollable collection of newsfeed compositions. In some examples, a newsfeed may scroll (e.g., upward and/or downward) to reveal different newsfeed compositions posted to the newsfeed, in response to receiving user scrolling input. In one example, the scrollable collection may include a collection of newsfeed compositions created by contacts of a particular user (e.g., friends of the particular user). The term "newsfeed composition" as used herein generally refers to any type or form of composition that may be displayed in a newsfeed. Newsfeed compositions may include, without limitation, text-based compositions, media-based compositions (which may include either a single media item or a collage of multiple media items), and/or reference-based compositions (e.g., with a link to an online article). In some examples, as will be described in greater detail below, a digital trail (e.g., digital trail 119) may be posted as a newsfeed composition.

In some embodiments, a stories platform may provide users with a story-feed and/or enable users to create and/or post story compositions. The term "story-feed" may generally refer to any type or form of social media consumption channel that presents a continuous series of digital story compositions to a story-consumer, one by one. In one example, the story consumption channel may transition from presenting one digital story composition to the next automatically, without requiring any user input to do so. In some examples, a digital story composition may be ephemeral (that is, the digital story composition may only be viewable for a predetermined amount of time). For example, a digital story composition may be set to disappear after twenty-four hours. The term "digital story composition" may generally refer to any type or form of social media composition intended for a story consumption channel. A digital story composition may include a variety of content (e.g., a digital photograph, a graphic, text, a digital video and/or a digital composition of a music composition). In some examples, digital story compositions from a same source (e.g., created and posted by a same user) may be grouped together within the story consumption channel, such that each digital story composition from a particular source is displayed prior to displaying digital story compositions from another source.

Trail platform 107 generally represents any type or form of digital framework that enables the creation and consumption of digital trails. The term "digital trail" may refer to a stream of thematically related visual compositions. Each composition within a digital trail may be created and added to the digital trail by a different user but may be subject to the same set of creative constraints. For example, each composition may be of the same type (e.g., each composition may be a still image and/or each composition may be an animation). Additionally, each composition may be subject to the same digital transformation (e.g., a same visual filter, a same speed setting, a same mixed reality element, etc.).

In some examples, the order of the compositions within a digital trail may be chronologically determined based on the order in which the compositions were added to the trail, with earlier-added compositions being positioned before later-added compositions within the trail. Additionally or alternatively, the compositions within a digital trail may be sequence-dependent. For example, each composition may represent a predetermined segment of a digital work (e.g., each visual media work may represent a different portion of a video). As another example, each composition following an initial composition may respond to the composition that immediately precedes it within the trail (e.g., following a question-and-answer format). In some examples, each composition within a trail may respond to a trigger composition or prompt. For example, an initial composition (e.g., a trigger composition) and/or prompt may pose a question or make a request for each subsequent composition to respond to.

Trail platform 107 may enable three stages for a particular trail: an initiation stage, in which the trail is initiated by a trail-initiator user (i.e., a "trail-blazer") via a trail-initiation interface, a collection stage, in which compositions are collected to add to the trail (e.g., from the trail-initiator user and/or one or more additional users invited to contribute to the trail), and a consumption stage, in which the resulting trail is shared to one or more users of a social media service for user consumption (e.g., via trail platform 107 and/or a status-broadcasting platform of the social media service). The initiation stage may include (1) the selection of a trail mode for the trail, (2) the selection of one or more creative constraints and/or transformations to be applied to each composition added to the digital trail, and/or (3) the creation of an initial composition for the trail. The initiation stage may also include the configuration of a composition-creation interface, to be used to create compositions to be added to the trail, that is specific to the selected trail mode (e.g., that only enables the creation of a type of composition that corresponds to the selected trail mode and/or that conveys and/or applies selected creative constraints and/or transformations). Next, in the collection stage, trail platform 107 may provide the composition-creation interface to devices of contributor users and collect compositions created in response. Finally, in the consumption stage, the compositions added to the trail may be displayed in the order in which they were collected. The relationship between the collection stage and the consumption stage may be cyclic, with the display continually being updated to include new compositions as they collected.

In some examples, a digital trail may be non-ephemeral (i.e., with no platform-imposed expiration period) and evergreen (i.e., may be open to receiving new compositions to be added to the trail as long as the trail has not been removed from the social media service and/or trail platform 107). In some examples, contributors to a digital trail may have varying rights of removal. For example, a trail-initiator user may have a right to remove an entire digital trail and each contributor to the trail may have only a right to remove a composition added to the digital trail by that contributor. Similarly, trail platform 107 may enable a user to share (e.g., via status-broadcasting platform) an entire digital trail or to share an individual composition from within a digital trail.

Figure 2:
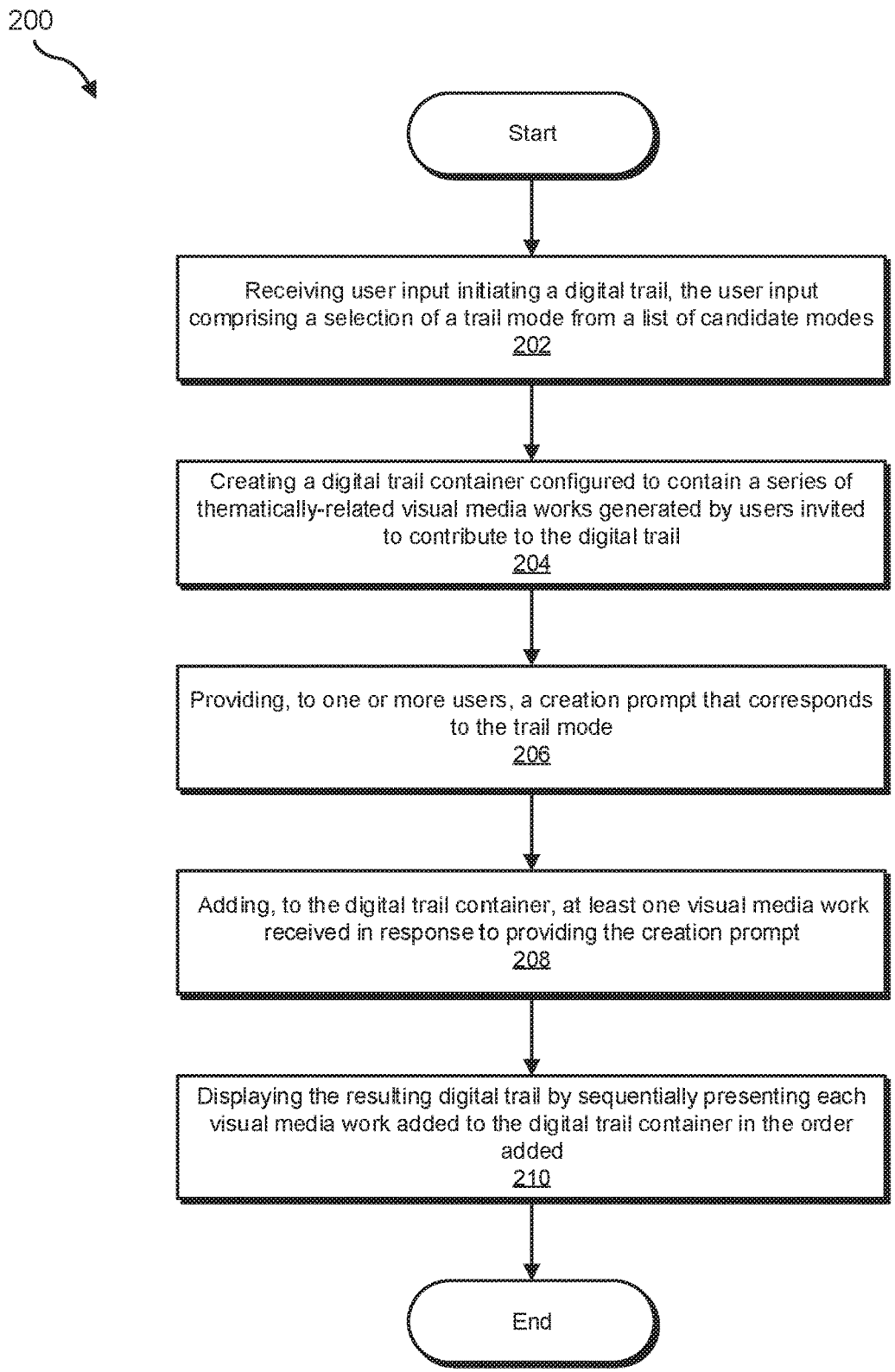
FIG. 2 is a flow diagram of an exemplary method for generating and broadcasting digital trails of visual media.

FIG. 2 is a flow diagram of an exemplary method 200 for generating and broadcasting digital trails of visual media compositions. As illustrated in FIG. 2, at step 202, one or more of the systems described herein may receive user input initiating a digital trail, the user input including a selection of a trail mode from a list of candidate modes in response to receiving the user input. For example, receiving module 108 may, as part of server 106 in FIG. 2, receive user input 118 initiating digital trail 119, user input 118 including a selection of trail mode 117 from list of candidate modes 115.

Receiving module 108 may receive the user input in a variety of ways and/or contexts. For example, receiving module 108 may be part of a social media platform and may receive the user input from a user account of the social media platform. Additionally or alternatively, receiving module 108 may be part of a trail-specific application that primarily generates and/or displays digital trails.

The term "trail mode" may generally refer to any one or more constraints placed on digital compositions added to a trail and/or transformations applied to the digital compositions added to a trail. For example, a trail mode may specify that only compositions of a certain type, such as still images (e.g., digital images), videos, and/or animations, may be added to a trail. In another example, a trail mode may specify that compositions added to a trail include content with certain elements, such as a doodle face, a mixed reality element, and/or an element from a previous composition in the trail. In one embodiment, a trail mode may specify a minimum and/or maximum length of compositions added to a trail and/or an exact length (e.g., for videos and/or animations) of compositions added to the trail.

In some examples, a trail mode may enable a user to select one or more digital transformations to be applied to each composition added to a trail, such as making videos or images black and white, applying a filter to a composition, adding an augmented reality element to videos, and/or increasing or decreasing the speed of animations or videos. In these examples, which digital transformations are available for selection may depend on the trail mode selected by the user. Additionally or alternatively, one or more digital transformations may be automatically selected for particular modes.

In some embodiments, a trail mode may enable a user to specify a prompt that suggests creative constraints and/or content for compositions added to a trail by additional users invited to contribute to a trail. For example, a trail mode may enable a trail-initiator user to specify a theme of images to be added to a trail. In some examples, a trail mode may include multiple constraints and/or transformations. For example, a trail mode may specify that compositions added to the trail be black-and-white photos that include an object chosen by a trail-initiator user.

In some embodiments, the user input may additionally include permissions information about users who are permitted and/or invited to contribute to the trail. In some embodiments, the systems described herein may display permissions options that include an option to permit a preexisting list of users to add compositions to the digital trail (e.g., a user's friends list, members of a group of users, etc.), an option to create a new list of users permitted to add compositions to the digital trail, and/or an option to permit all users (e.g., all users with an account on a social media platform of a social media service) to add compositions to the digital trail. Additionally or alternatively, the user input may include a selection of a discoverability option. For example, the systems described herein may enable a trail-initiator user to select whether a trail is visible to all users who have permission to add compositions to the trail, all users who receive a link and/or invitation to view the trail (regardless of editing permissions), and/or all users (e.g., via a global trail browsing interface).

At step 204, one or more of the systems described herein may create a digital trail container configured to contain a series of thematically related compositions generated by users invited to contribute to the digital trail. For example, creation module 110 may, as part of server 106 in FIG. 2, create digital trail container 120 configured to contain series of thematically related compositions 126 generated by users invited to contribute to digital trail 119.

Creation module 110 may create the digital trail container in response to a variety of triggers. For example, creation module 110 may create the digital trail container in response to receiving the selection of the trail mode. Additionally or alternatively, creation module 110 may create the digital trail container in response to receiving a composition to be added to the trail from a trail-initiator user. In some examples, creation module 110 may continue to maintain the digital container non-ephemerally (i.e., with no automatic expiration date), deleting the digital container only in response to receiving user input selecting to delete the digital trail.

The term "composition" or "visual media work" may generally refer to any visual (e.g., still image, animation, and/or video) composition supplied by a user. In some embodiments, a composition may be created via the camera of a user device such as a mobile phone, tablet, or laptop. Additionally or alternatively, a composition may be created via an image editing application that is installed on a user device and/or part of a trail platform. In some trail modes, a trail may be configured to only accept user-generated compositions that are created by a user via a trail interface (e.g., a trail creation interface), as opposed to pre-existing media not created by the user and/or not created via the trail interface. In other trail modes, a trail may be configured to accept pre-existing compositions selected (e.g., from a list) and/or uploaded by a user that are not necessarily created by the user. In some examples, the compositions added to a trail may be thematically related compositions that all follow similar constraints, contain similar content, and/or are otherwise related by theme.

At step 206, one or more of the systems described herein may provide, to one or more users, a creation prompt that corresponds to the trail mode. For example, prompt module 112 may, as part of server 106 in FIG. 2, provide, to one or more users, prompt 122 that corresponds to trail mode 117.

Prompt module 112 may provide the creation prompt in a variety of ways and/or contexts. For example, prompt module 112 may provide the creation prompt via a trail interface that enables a user to create a composition in response to the prompt. In some embodiments, the systems described herein may display the compositions currently in the trail and may then display the prompt after displaying some or all of the compositions. Additionally or alternatively, the prompt may be presented persistently, as the current compositions are displayed. Prompt module 112 may provide the creation prompt to a variety of users. For example, prompt module 112 may provide the creation prompt to a user initiating the digital trail as part of a trail initiation process and/or to a user consuming the digital trail (e.g., immediately after sequentially presenting, as part of a trail consumption process, each composition already added to the digital trail container in the order added). Additionally or alternatively, prompt module 112 may transmit the creation prompt (e.g., within a message and/or notification) to one or more users invited to contribute to the digital trail (e.g., users indicated by a privacy setting selected during a trail initiation stage). In some examples, prompt module 112 may transmit the creation prompt as a newsfeed post within a newsfeed, within a private message (e.g., within an email and/or text message), and/or as a digital story within a story-feed.

The term "creation prompt" or "prompt," as used herein, may generally refer to any information and/or cues presented to a user via a display element of a user device. In some embodiments, a prompt may include text with suggestions about constraints and/or content to be included in a composition, such as a theme of a photo challenge, an image and/or animation to which to respond, a question to answer, and/or a visual element to include in compositions. The creation prompt may take a variety of forms. In some examples, the creation prompt may take the form of a selectable reply element (see, e.g., the add-reply button 408 and/or the terminal reply-tile depicted in FIG. 4). Additionally or alternatively, the creation prompt may include a text-based instruction and/or invitation and/or be provided alongside a text-based instruction and/or invitation (e.g., included within a private message and/or notification).

In some examples, prompt module 112 may solicit additional compositions for the digital trail (passively and/or actively) indefinitely (i.e., there may be no policy dictating an automatic deadline for contribution). In certain examples, the systems disclosed herein may not enable commenting (e.g., via a comments section and/or emoji-selection) for the digital trail, such that the only way for a viewer of the digital trail to digitally respond to the digital trail is to digitally add a composition to the digital trail.

After presenting the creation prompt, prompt module 112 may receive user input provided to creation prompt initiating the creation of the composition for the digital trail. In response to receiving the additional user input, a creation module may provide a creation interface for composition a new composition to be added to the digital trail. The creation interface may generally represent any type or form of trail-composition interface that enables the creation of a composition to be added to an existing digital trail. In some examples, the creation interface may represent a composition-consumption interface that both presents a digital trail and enables the composition of visual media works to be added to the presented digital trail. In some examples, the creation interface may include the creation prompt and/or some or all of the content described above in connection with the creation prompt.

Prior to providing the creation interface, the creation module may select and/or configure the creation interface to correspond to the trail mode selected during the trail initiation stage. For example, the creation module may select and/or configure a creation interface that enables only the creation of a particular type of visual media work that corresponds to the selected trail mode (e.g., a creation interface with an element to start creating a video and/or a creation interface with an element to start creating and/or upload a still image). In some examples, the creation interface may include content that coincides with a prompt and/or theme selected by the trail-initiator user (e.g., text describing the suggested theme of a photo, a depiction of a visual element to be included in a composition, etc.). In examples in which the trail mode is a sequence-dependent trail mode (e.g., a collaborative drawing mode), the creation interface may be configured to include content detected from a previous composition within the digital trail (and/or to include content that is based on the detected content). After providing the creation interface, the creation module may receive one or more visual media works created and/or selected via the creation interface by one or more users.

At step 208, one or more of the systems described herein may add, to the digital trail container, at least one composition received in response to providing the creation prompt. For example, adding module 114 may, as part of server 106 in FIG. 2, add, to digital trail container 120, visual media work 124 received in response to providing prompt 122.

Adding module 114 may add the composition in a variety of ways and/or contexts. For example, the systems described herein may enable a user to create and/or select a composition via a trail interface (e.g., the creation interface described in connection with step 206) and may automatically add the composition once completed. Additionally or alternatively, adding module 114 may enable a user to upload a composition created via another application.

In some embodiments, adding module 114 may perform a digital transformation (e.g., a transformation specified during a trail's initiation and/or a transformation that is inherent to the trail's mode) to each composition added to the digital trail container. For example, adding module 114 may apply a filter, speed up or slow down a video or animation, add an augmented reality element to an image or video, crop or resize a video or image, add audio, and/or perform any other relevant digital transformation. In these embodiments, the transformation may be automatically performed for each composition added to the digital trail container.

As mentioned above, and as will be discussed in greater detail below, some trails may be sequence-dependent, with each composition within a trail configured to respond to the composition immediately preceding it within the trail. In such trails, adding two compositions in tandem (i.e., responding to the same previous composition) may be problematic. Thus, the systems described herein may include one or more mechanisms for dealing with (e.g., preventing) duplicate responses to a particular composition. In one embodiment, prompt module 112 may display (at step 206) a creation prompt for a digital trail within multiple interfaces, each being displayed to a different user. But, once the creation prompt is selected (i.e., a creation process has been initiated) via one of the interfaces, the creation prompt (and/or a reply element within the creation prompt) may be removed from all of the other interfaces. If the creation process is aborted, the creation prompt (and/or the reply element within the creation prompt) may reappear in the other interfaces. If the creation process is completed, the composition created via the creation process may be added to the digital trail container and a creation prompt (and/or a reply element) may reappear in the other interfaces but may be configured to create a composition to be added after the composition just added.

Additionally or alternatively, if a second user selects a creation prompt (and/or a reply element within the creation prompt) to add a composition while a first user is in the process of creating a composition, the systems described herein may display an error message to the second user (e.g., a notification that another composition is in progress) without enabling the second user to begin a composition process until the other composition is completed. In some embodiments, if two or more users begin to create compositions in response to the same composition at the same time, each of the users may be enabled to begin a composition process but only the first composition finished may be added to the digital trail container, with subsequent users being sent an error message upon completing their compositions and/or upon the completion of the first composition (e.g., a notification that another composition has been added and/or prompting the user to create a composition in response to the other composition).

Additionally or alternatively, the systems described herein may add multiple compositions created in response to the same previous composition to the digital trail container. In some embodiments, the systems described herein may enable a trail initiator to delete compositions, such as redundant compositions that respond to the same composition. In one such embodiment, the systems described herein may flag redundant compositions for a trail initiator and enable the trail initiator to select which of the redundant compositions to include in a trail (e.g., via an initiator selection interface).

At step 210, one or more of the systems described herein may display the resulting digital trail by sequentially presenting each composition added to the digital trail container in the order added. For example, display module 116 may, as part of server 106 in FIG. 2, display digital trail 119 by sequentially presenting each visual media work added to digital trail container 120 in the order added. In some examples, display module 116 may auto-advance from one visual media work to the next (e.g., similar to a slideshow format).

Display module 116 may display the digital trail to a variety of users. For example, display module 116 may display the digital trail only to users who are permitted to add compositions to the digital trail. Additionally or alternatively, display module 116 may display the digital trail to users who are not permitted to add compositions but are permitted to view the digital trail (e.g., based on a privacy setting selected by the trail-initiator user).

Display module 116 may display the digital trail in a variety of contexts. In some examples, display module 116 may display the digital trail within a consumption channel of a platform provided by a social media service (e.g., via a social media consumption interface). For example, display module 116 may display the digital trail as a newsfeed composition within a newsfeed provided by a newsfeed platform, as a digital story within a story-feed provided by a stories platform, within a private message sent via a messaging platform, and/or within a dedicated trail-consumption channel (e.g., a dedicated trail-consumption interface) provided via a dedicated trail platform. In these examples, a user sharing the digital trail may either share an entire trail and/or may share an individual composition from a trail. In examples in which a user shares an individual composition from a trail, a social media platform may either present the individual composition in isolation or, after presenting (e.g., displaying and/or playing) the individual composition, may begin auto-advancing to the subsequent media compositions within the trail.

In some examples, display module 116 may additionally provide, within a social media consumption interface used to display the digital trail, a scrollable progress bar. The scrollable progress bar may indicate, for a media composition currently being presented, both (1) the media composition's position within the digital trail and (2) a temporal progress of the media composition.

In these examples, the progress bar may be sequentially divided into multiple sub-portions, the number of sub-portions corresponding to the number of media compositions within the digital trail. Each sub-portion may be of a set length. In some examples, this set length may be uniform (i.e., the same for each sub-portion). Additionally, each sub-portion may correspond to one of the media compositions within the digital trail, where the first sub-portion corresponds to the first media composition within the digital trail, the second sub-portion corresponds to the second media composition, the third sub-portion corresponds to the third media composition, and so on. When a particular media composition is being presented, a demarcation (e.g., a bolded and/or colored appearance) may begin to fill the sub-portion corresponding to the particular media composition. A percentage of the sub-portion's length that is demarked may correspond to a percentage of media composition that has been presented. Once the presentation of the media composition is complete, a subsequent media composition may begin to be presented and the demarcation may reset (i.e., may clear from the sub-portion and may begin to fill the subsequent sub-portion of the progress bar), such that at any given moment, only one of the sub-portions of the progress bar may be filled or partially filled.

The steps described above may be implemented in connection with a variety of different trail modes. While the ensuing discussion focuses on one trail mode at a time, the content discussed for one mode may be applicable each of the other modes as well.

Figure 3:
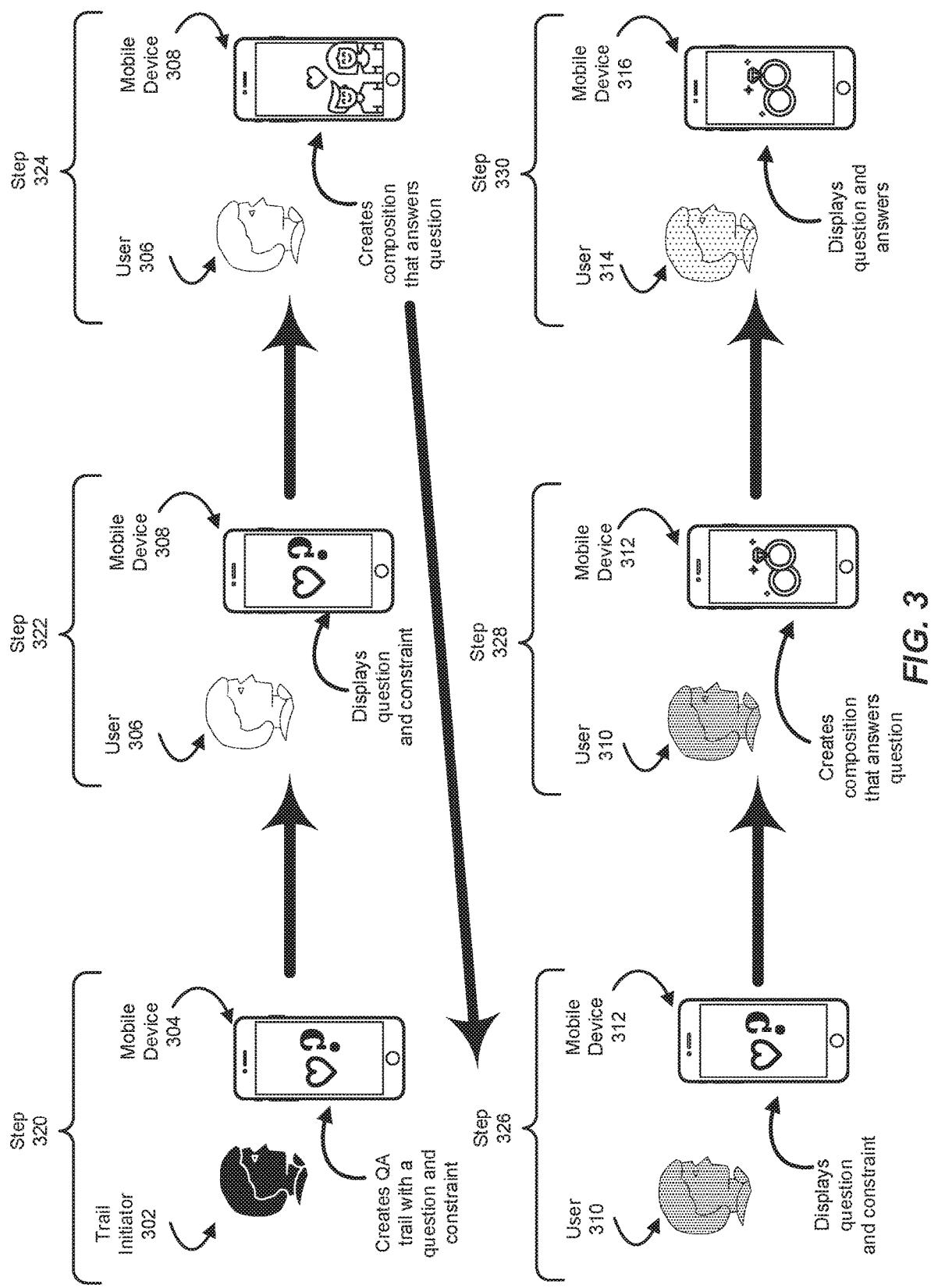
FIG. 3 is an illustration of an exemplary method for creating a question-and-answer trail.

In some embodiments, the systems described herein may include a themed-response mode that facilitations the creation of a themed-response trail in which each composition responds to a theme. In one such example, the systems described herein may facilitate the creation of a question-and-answer trail that includes different users each creating a work of visual media that answers a question posed by the trail initiator. FIG. 3 illustrates an example method for creating a question-and-answer trail. At step 320, the systems described here may receive user input from a trail initiator 302 (e.g., a first user), via a mobile device 304, creating (i.e., initiating) a new question-and-answer trail for a question. Although illustrated as a mobile phone, mobile device 304 may broadly represent any personal mobile device including tablets, laptops, and/or smart accessories.

The systems described herein may enable the user's creation (i.e., initiation) of the new question-and-answer trail in a variety of ways. In some embodiments, the systems described herein may display a trail creation interface via an app on mobile device 304, such as a trail app, which may represent either a standalone trail application, a social media application, and/or an application that operates as part of a collection of social media services provided by a social media platform. In some examples, the trail creation interface may enable trail initiator 302 to select a trail mode, such as question-and-answer mode, from a list of available trail modes presented within the trail creation interface.

In response to receiving the selection of the question-and-answer mode, the systems described herein may then present an interface specific to the question-and-answer mode that enables trail initiator 302 to specify a question. In some embodiments, the interface may present a prepopulated list of questions that may be selected via user input. Additionally or alternatively, the systems described herein may enable trail initiator 302 to type a question and/or otherwise provide a question. In some embodiments, the systems described herein may also enable and/or require trail initiator 302 to specify a constraint for the question-and-answer trail. For example, the systems described herein may prompt trail initiator 302 to specify a creative constraint on the content of compositions (e.g., must include an image of a person, must include a certain augmented reality element, etc.), a digital transformation to be applied to compositions (e.g., transform images to black-and-white), a technical constraint on the type of compositions (e.g., only still images), and/or any other suitable type of constraint. Once the systems described herein have received the user input initiating the new question-and-answer trail, the systems may create a digital container for the initiated question-and-answer trail.

At step 322, a trail platform and/or application may present, to a user 306 (e.g., a second user) via a mobile device 308, the question posed by trail initiator 302. In some embodiments, the systems described herein may display, via a trail interface provided by a trail app on mobile device 308, the question, and may then transition into enabling user 306 to supply a composition that responds to the question, either within a portion of a trail consumption interface or within an additional creation interface. At step 324, the systems described herein may enable user 306 to answer the question with a visual media work and may receive a composition of user 306, created via the trail app on mobile device 308, in response to the question. Then, the systems described herein may add this composition to the digital trail container for the trail.

At step 326, the systems described herein may, via a trail app on a mobile device 312, present the question supplied by trail initiator 302 to a user 310 (e.g., a third user). In some examples, the systems described herein may also present the composition by user 306 to user 310 (e.g., via a trail consumption interface on mobile device 312). At step 328, a trail composition interface may, via mobile device 312, prompt user 310 to answer the question, enable user 310 to create a visual media work in response to the question, receive the visual media work, and add the visual media work to the digital trail container. At step 330, the systems described herein may, via a trail app on a mobile device 316, present the question supplied by trail initiator 302 to a user 314 (e.g., a fourth user). In some examples, the trail composition interface may, via mobile device 316, prompt user 314 to answer the question, enable user 314 to create a visual media work in response to the question, receive the visual media work, and add the visual media work to the digital trail container.

Following step 330, the trail platform and/or application may, in some examples, enable trail initiator 302, user 306, user 310, user 314, and/or an additional user to then view the visual media works that answer the question and/or add additional visual media works. In some embodiments, the trail interface may be configured such that each user may only add one composition to the question-and-answer trail. Alternatively, the trail interface may be configured such that any user may add more than one composition. In some embodiments, the trail interface may be configured such that no user can add immediately adjacent compositions to the trail.

In the embodiment described in connection with FIG. 3, each composition in the question-and-answer trail is created sequentially, and compositions are added to the trail in the order received. In other embodiments, an order of compositions may be determined prior to receiving user compositions. In one such embodiment, a set of users may be invited to contribute to the question-and-answer trail and each invited user may receive (e.g., in parallel) a prompt to answer the question. Then, the systems described herein may order the compositions based on the previously determined order. In these embodiments, the order of the compositions within the trail may not depend on the order of creation.

Figure 4:
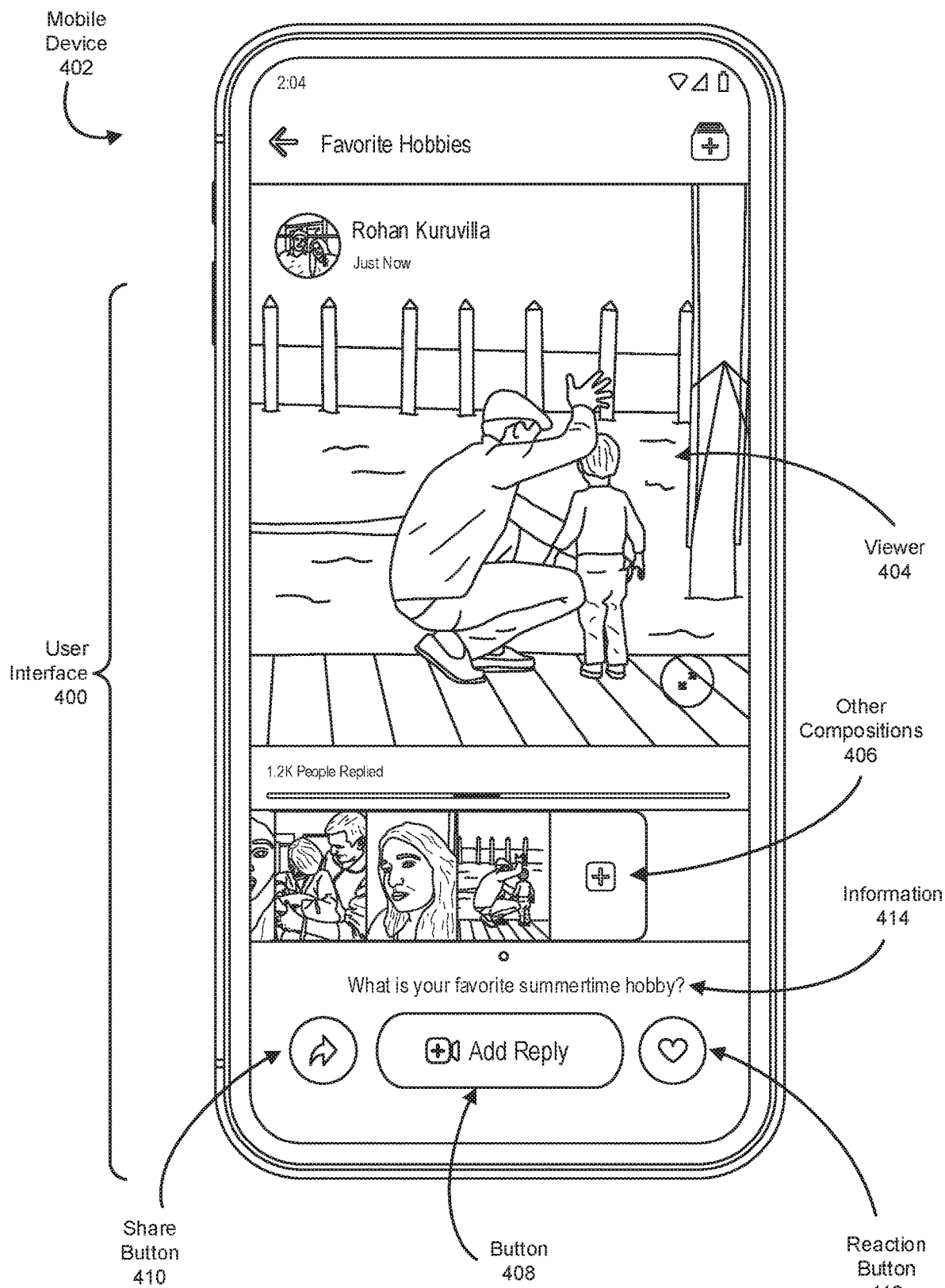
FIG. 4 is an illustration of an exemplary user interface for creating a question-and-answer trail.

As mentioned above, in some embodiments, the systems described herein may present a composition and/or various information about a composition for a question-and-answer trail via a user interface in a trail app. The user interface may take a variety of forms and may include a variety of content. For example, as illustrated in FIG. 4, the systems described herein may provide a user interface 400 that displays a viewer 404. Viewer 404 may display, one by one, the trail's compositions (e.g., images that answer a question that forms a basis of a question-and-answer trail). As shown in FIG. 4, in some embodiments, the systems described may display, within user interface 400, a strip of thumbnails and/or links to other compositions 406 within the trail. The strip may enable a user to view past/upcoming compositions and/or to navigate between compositions that are part of the same question-and-answer trail (e.g., by navigating to a composition corresponding to a thumbnail selected via user input). In some examples, other compositions 406 may be organized in a set order (e.g., the order in which the compositions were added). In one example, the systems described herein may be configured to auto-advance between other compositions 406 (i.e., changing which composition is displayed in viewer 404) in the set order but may also enable a user to navigate between other compositions 406 in any order.

In some embodiments, the systems described herein may display information 414 about the trail and/or the composition currently displayed within viewer 404 within user interface 400 (e.g., alongside viewer 404). Information 414 may include a variety of content and/or elements. For example, information 414 may include a creation prompt for the composition, such as the question for the question-and-answer trail. In this and other modes, a creation prompt may include whole-trail content, which is the same for each composition added to the trail, and/or may include composition-specific content (e.g., an instruction that is specific to the next composition to be added to the trail). User interface 400 illustrates a creation prompt with whole-trail content (e.g., the question).

In embodiments in which viewer 404 is displayed via the user account of a viewer who is eligible to add an additional composition to the trail, user interface 400 may include (e.g., within the display of other compositions 406) an interface element that launches a composition interface that enables the viewer to create a composition within the question-and-answer trail. In some embodiments, the launching element may take the form of, or be included as part of, a final thumbnail within the strip of thumbnails. Additionally or alternatively, the launching element may represent an element, such as button 408, that is persistently presented as each of the other compositions 406 is displayed. Additionally or alternatively, the systems described herein may display a share button 410 within user interface 400 that enables the viewer to share the trail and/or an individual composition from within the trail. In one embodiment, the systems described herein may display a reaction button 412 within user interface 400 that enables the viewer to add a reaction (e.g., like, love, etc.) to the trail and/or the composition currently presented (e.g., via viewer 404).

Moving on from a question-and-answer mode, in some embodiments, a trail mode may promote, for each composition added to a digital trail container after an initial composition, a specified relationship between the composition and a previous composition that immediately precedes the composition within the digital trail. For example, a trail mode may promote a relationship between compositions in which each composition is a response to the previous composition.

In one such example, an animation response mode may facilitate the creation of an animation response trail (e.g., a "GIFY-talks trail") that includes compositions from different users that are each an animation that responds to an immediately previous animation in the trail. The term "animation" may generally refer to any sequence of images, typically but not always without audio. In some embodiments, an animation may be a specific file format, such as a GIF. In some examples, an animation may include a subtitle. The term "subtitle" generally refers to text that accompanies an image or sequence of images, which may be positioned at any position over and/or alongside an image or sequence of images (e.g., at the bottom, top, center, beneath, etc.).

A similar mode (i.e., a meme response mode) may facilitate the creation of a meme response trail. The term "meme" may generally refer to a subtitled still image. A meme response trail may include compositions from different users that are each a meme that responds to a previous meme in the trail (e.g., that each has a subtitle that responds to the subtitle of the previous meme in the trail). In some examples, a visual response mode may enable users to include a combination of animation-based compositions, image-based compositions, and/or meme-based compositions. While the discussion below of FIGS. 5-6 centers on an animation-based mode, the principles discussed therein may each be applied to a meme-based mode or a combination visual response mode.

Figure 5:
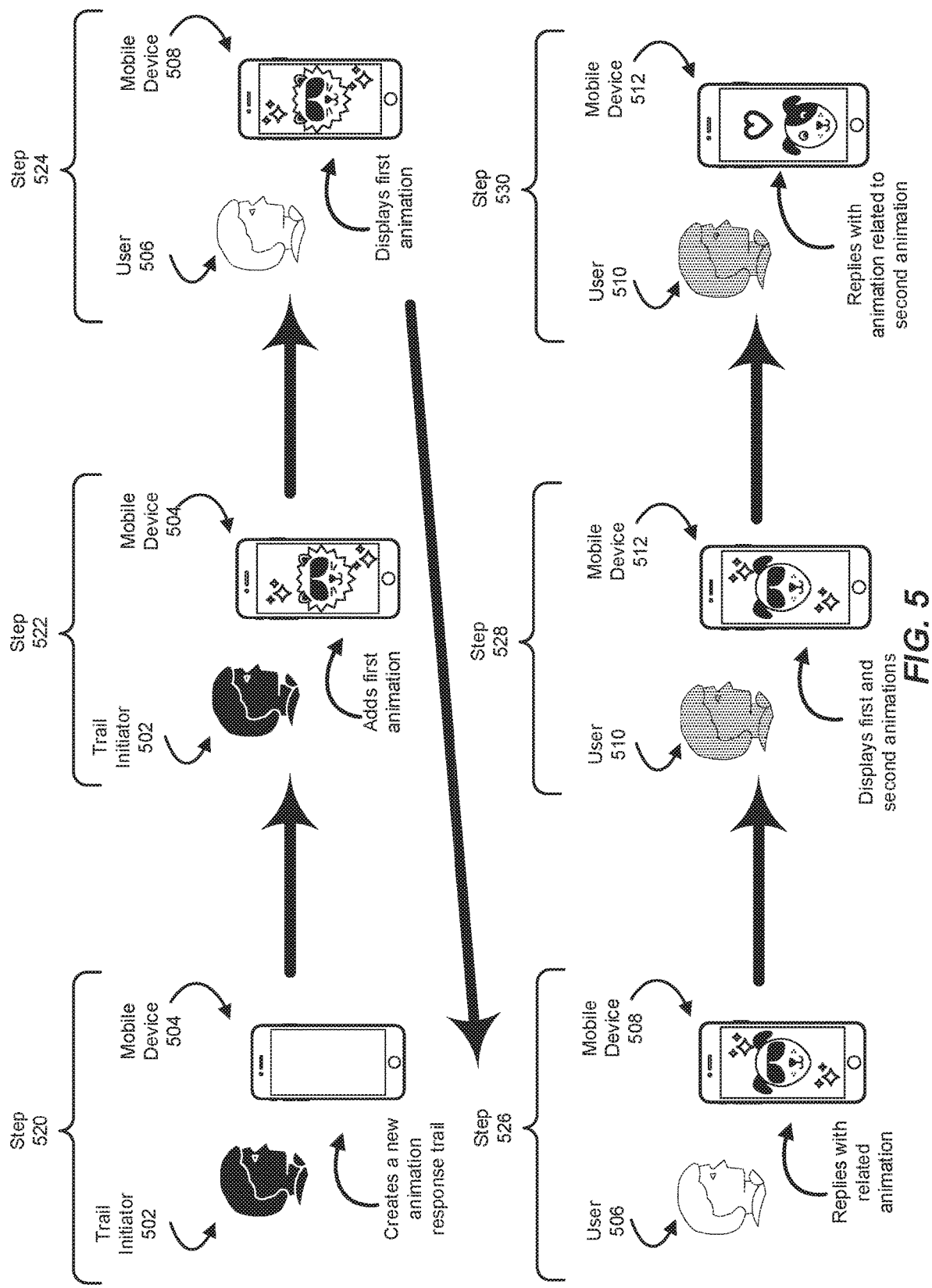
FIG. 5 is an illustration of an exemplary method for creating an animation response trail.

FIG. 5 illustrates an example method for creating an animation response trail. At step 520, a trail creation interface may, in response to receiving input from a trail initiator 502 via a mobile device 504 (e.g., selecting an animation response mode via a trail app), create a new animation response trail. In some examples, the systems described herein may create a digital trail container for the new animation response trail in response to receiving the user input that initiates the trail.

In some embodiments, the systems described herein may not require trail initiator 502 to specify a creation prompt after trail initiator 502 selects animation response as the trail mode due to animation response compositions each being based on the previous composition with no overarching content requirement or additional constraints. In some such embodiments, the systems described herein may require, as part of the trail initiation, trail initiator 502 to select or supply an initial animation for the trail.

In one embodiment, the systems described herein may enable and/or require trail initiator 502 to select a list of candidate animations for inclusion in the animation response trail (e.g., via a portion of the trail creation interface specific to the animation response mode). In this embodiment, the systems described herein may limit contributors to the trail to only adding, to the trail, an animation selected from a list of animations determined by the trail initiator. Additionally or alternatively, the trail creation interface may enable trail initiator 502 to specify a digital transformation (e.g., filter) to be applied to each animation added to the animation response trail, a minimum and/or maximum length for each animation added to the animation response trail, an audience for the animation response trail, and/or other preferences for the animation response trail.

At step 522, the trail composition interface may, via a trail app on mobile device 504, receive an animation from trail initiator 502 (e.g., selected from a list of available animations and/or uploaded). In some embodiments, the systems described herein may add the animation supplied by trail initiator 502 to the digital trail container. In certain examples, the systems described herein may receive the first animation from a different user after trail initiator 502 creates the trail (instead of receiving the first animation from trail initiator 502).

At step 524, the systems described herein may present the first animation to a user 506 via a trail consumption interface of a trail app on a mobile device 508. In some embodiments, the systems described herein may display, via a trail consumption interface provided by the trail app on mobile device 508, the first animation and may then transition into enabling user 506 to add an animation, either within a portion of the trail consumption interface or within an additional creation interface. In some examples, the systems described herein may provide a reply element within the trail consumption interface that triggers this transition when selected via user input.

Then (e.g., in response to receiving user input from user 506 selecting a reply element), the systems described herein may enable user 506 to select and/or supply an animation responding to the first animation and may receive the animation from user 506 via the trail app on mobile device 508 (step 526). In some embodiments, the systems described herein may display, via the consumption interface, creation interface and/or composition interface, the previous animation to which user 506 is selecting a response animation. In some embodiments, the composition interface may enable user 506 to upload any animation. Additionally or alternatively, the composition interface may present user 506 with a list of selectable animations. Upon receiving an animation from user 506, the systems described herein may add the animation from user 506 to the digital trail container created for the animation response trail.

Figure 6:
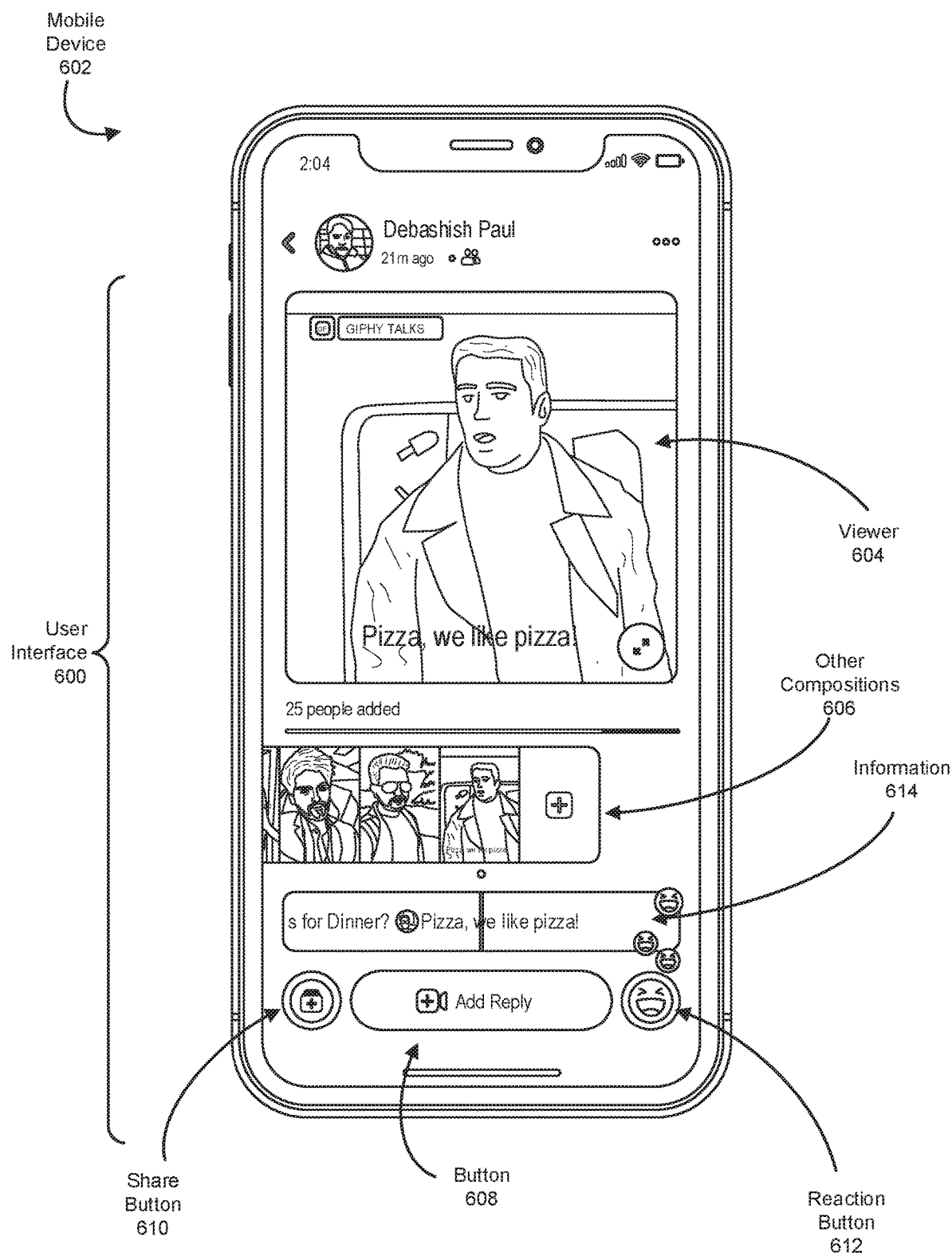
FIG. 6 is an illustration of an exemplary user interface for creating an animation response trail.

An animation may respond to a previous animation in a variety of ways. In some examples, an animation may respond to a previous animation by responding to the previous animation's subtitle. For example (as illustrated in FIG. 6), a first animation may include a subtitle with the text "What's for Dinner?" and a second animation, immediately following the first animation within a trail, may include a subtitle with the text "Pizza! We like Pizza!" or (not depicted) may include an animation of a malicious toaster burning a bagel. Additionally or alternatively, an animation may respond to the image depicted in the previous animation (e.g., an image of a person clapping may respond to an image of someone accepting an award). In certain embodiments, only one type of animation may be permitted in a trail (e.g., only subtitle animations or only non-subtitled animations). For example, the systems described herein may provide each contributor with a list of selectable animations that may be added to the trail, and the list may only include animations of the permitted type.

At step 528, the systems described herein may, via a trail consumption interface of a trail app on a mobile device 512, present to a user 510 the first and second animations. In some embodiments, the trail app may present the first and second animations in the order in which the animations were selected. After transitioning to enabling user 510 to add an animation, at step 530, the trail app on mobile device 512 may receive an animation selected and/or uploaded by user 510 that responds to the second animation (supplied by user 506) and may add the composition to the digital trail container.

In some embodiments, similarly to the question-and-answer mode described above in connection with FIG. 3, the systems described herein may enable the same and/or additional users to continue adding animations to the animation response trail. In some embodiments, an animation response trail may not have any limit to the number of animations that may be added and/or any set expiration for contribution. Additionally or alternatively, the systems described herein and/or the trail initiator may configure the animation response trail to stop accepting additional compositions after a certain amount of time has passed since the creation of the trail (e.g., three days, one month, one year), after a certain amount of time has passed since the last composition was added, once a certain total composition time for the trail is reached (e.g., ten minutes, thirty minutes, an hour), and/or once a certain number of compositions are added (e.g., ten compositions, twenty compositions, fifty compositions).

As mentioned above in connection with FIG. 5, the systems described herein may present a composition and/or various information about a composition for the animation response trail via a user interface (e.g., a user consumption interface) in a trail app. The user interface may take a variety of forms and may include a variety of content. For example, as illustrated in FIG. 6, the systems described herein may provide a user interface 600 that includes a viewer 604 that displays animations added to the animation response trail. As shown in FIG. 6, in some embodiments, the systems described may display, within user interface 600, a strip of thumbnails and/or links to other compositions 606 within the trail. The strip may enable a user to view past/upcoming compositions and/or to navigate between compositions that are part of the same animation response trail (e.g., by navigating to a composition corresponding to a thumbnail selected via user input). In some examples, other compositions 606 may be organized in a set order (e.g., the order in which the compositions were added). In one example, the systems described herein may be configured to auto-advance between other compositions 606 in the set order but may also enable a user to navigate between other compositions 606 in any order.

In some embodiments, the systems described herein may display information 614 about the trail and/or the animation currently displayed in viewer 604 within user interface 600 (e.g., alongside viewer 604). Information 614 may include a variety of content and/or elements. For example, information 614 may include the number of animations currently in the animation response trail, the number of users who have contributed to the animation response trail thus far, a written chronology of all subtitles included in the trail and/or any other relevant information.

In embodiments in which viewer 604 is displayed via the user account of a viewer who is eligible to add an additional composition to the trail, user interface 600 may include (e.g., within the display of other compositions 606) an interface element that launches a composition interface that enables the viewer to add an animation to the animation response trail. In some embodiments, the launching element may take the form of, or be included as part of, a final thumbnail within the strip of thumbnails. Additionally or alternatively, the launching element may represent an element, such as button 608, that is persistently presented as each of the other compositions 606 is played. Additionally or alternatively, the systems described herein may display a share button 610 within user interface 600 that enables the viewer to share the trail and/or an individual composition from within the trail. In one embodiment, the systems described herein may display a reaction button 612 within user interface 600 that enables the viewer to add a reaction (e.g., like, love, etc.) to the trail and/or the composition currently presented (e.g., viewer 604).

As an example of a trail mode that, rather than promoting a specified relationship between adjacent compositions, promotes a relationship between all compositions in a trail, in some embodiments, the systems described herein may provide a doodle face mode that facilitates the creation of a doodle face trail, in which each composition within a trail may include (1) a "doodle face" (a graphic of a face) and a word-based sound bite selected by a trail initiator and (2) an image selected by the user creating the composition, with the doodle face positioned in a location within the image selected by the user.

Figure 7:
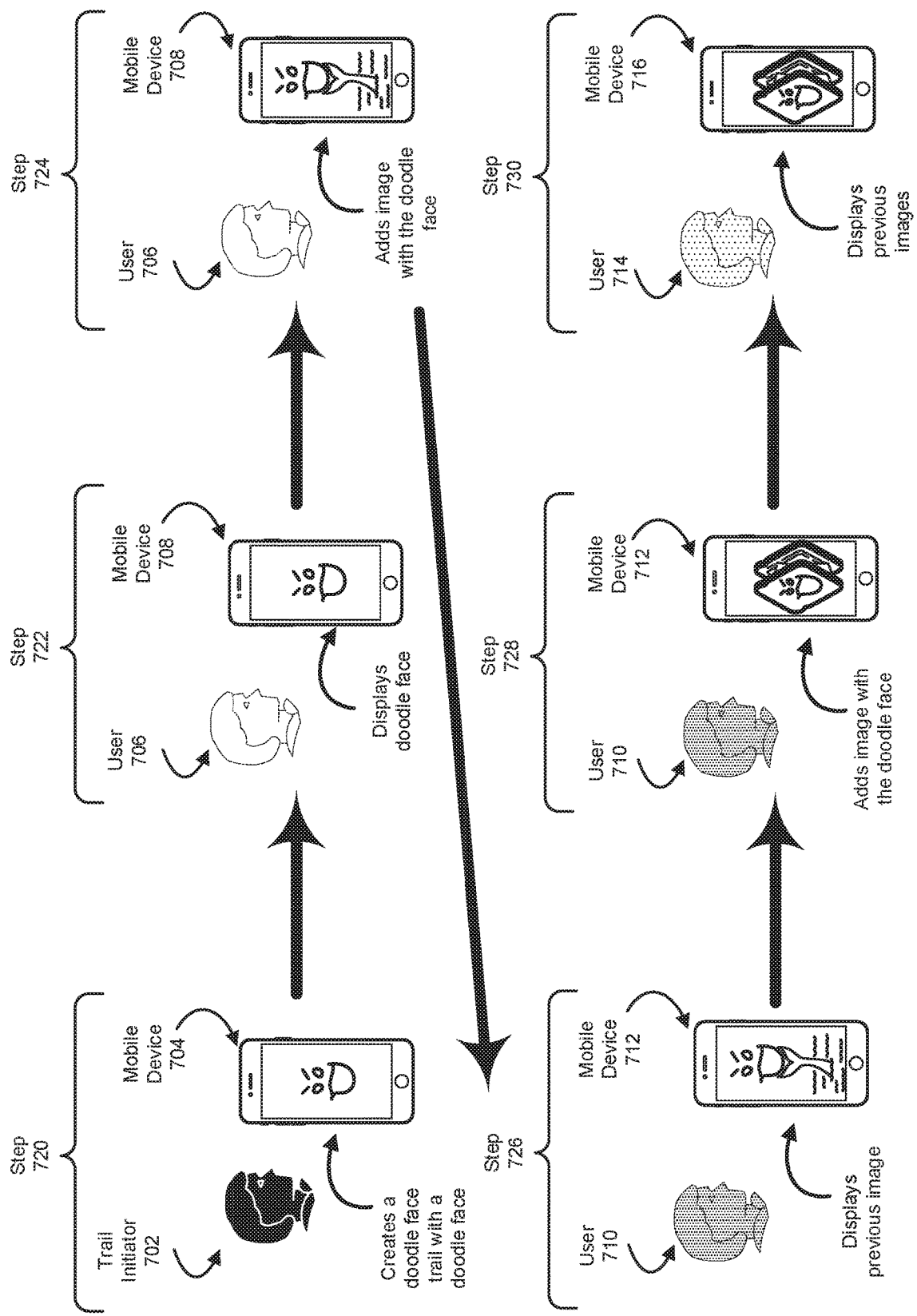
FIG. 7 is an illustration of an exemplary method for creating a doodle face trail.

FIG. 7 illustrates an example method for creating a doodle face trail within a doodle face mode. At step 720, a trail creation interface may, in response to input from a trail initiator 702 via a mobile device 704 (e.g., via a trail creation interface), create a new doodle face trail (e.g., by creating a digital container for the new doodle face trail). The term "doodle face" generally refers to a still image and/or animation of a cartoon face. In some examples, a doodle face may include eyes and/or a mouth. In some examples, a doodle face may additionally include arms, legs, and/or additional features. In some embodiments, a doodle face trail may include an additional constraint and/or transformation that applies to all compositions in the doodle face trail. For example, a doodle face trail may include an audio clip supplied by the trail initiator that is added to all animations added to the doodle face trail.

In some examples, the trail creation interface may enable and/or require trail initiator 702 to supply a doodle face as a prompt for the doodle face trail. In some examples, the prompt may be configured to serve as a whole-trail prompt, to be presented to each user prior to enabling the user to create a composition for the doodle face trail. In some embodiments, the trail creation interface may enable trail initiator 702 to select a doodle face from a list of pre-existing doodle faces and/or upload a doodle face. Additionally or alternatively, the trail creation interface may provide a graphic editor in which trail initiator 702 may draw a doodle face. In some embodiments, the trail creation interface may enable trail initiator 702 to supply an audio clip for the doodle face trail. For example, the trail creation interface may present trail initiator 702 with a list of pre-existing audio clips and/or may enable trail initiator 702 to record and/or upload an audio clip.

In some examples, the trail creation interface may enable trail initiator 702 to specify other features of the trail, such as a length of compositions (e.g., by selecting an audio clip of a particular length), a digital transformation (e.g., filter) to be applied to compositions, a total number of compositions for the trail to accept, a length of time during which compositions may be added to the trail, a specified user and/or list of users who may add compositions to the trail, a first user to invite to contribute, and/or any other relevant features. In some embodiments, the systems described herein may enable and/or require trail initiator 702 to create a first composition for the trail that includes the doodle face. Additionally or alternatively, the systems described herein may enable trail initiator 702 to share the doodle face trail with one or more users who may be invited to create the first composition.

At step 722, the systems described herein may present, to a user 706, the doodle face via a trail consumption interface of a trail app on a mobile device 708. For example, the systems described herein may display a still image and/or animation of the doodle face on a blank background. Additionally or alternatively, if trail initiator 702 created a composition that includes the doodle face, the systems described herein may present user 706 with the composition. In some embodiments, the systems described herein may then transition into enabling user 706 to create a visual media work that includes the doodle face, either within a portion of the trail consumption interface or within an additional creation interface. Then, at step 724, the systems described herein may enable user 706 to create a visual media work that includes the doodle face via the trail app on mobile device 708.

Figure 8:
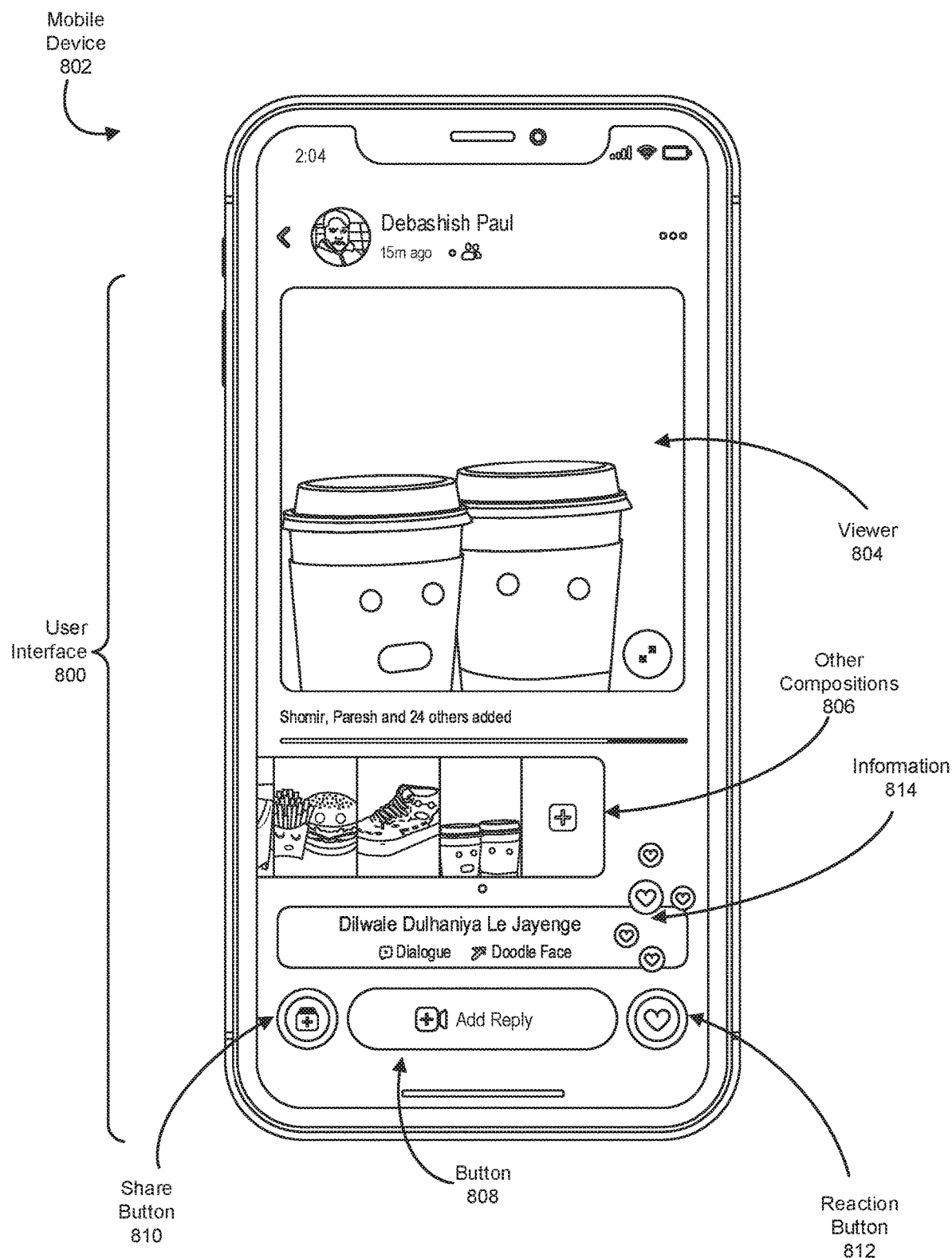
FIG. 8 is an illustration of an exemplary user interface for creating a doodle face trail.

The systems described herein may enable a user to create a visual media work in a variety of ways. In some embodiments, the systems described herein may provide an image editing tool that enables the user to place the doodle face over an image. In some examples, the systems described herein may enable the user to upload the image and/or select the image from a database of images provided via the trail app. Additionally or alternatively, the systems described herein may enable the user to (1) take a photo via a camera (e.g., a camera of mobile device 708) and (2) place the doodle face onto the photo. In some embodiments, the image editing tool may enable the user to resize and/or crop the image. In one embodiment, the image editing tool may enable the user to resize, position, edit, and/or duplicate the doodle face. For example, the image editing tool may enable the user to position the doodle face over a coffee cup, resize the doodle face to fit on the cup, and/or copy a portion of the doodle face to add eyes to an adjacent coffee cup (e.g., as illustrated in FIG. 8).

Returning to FIG. 7, in some embodiments, the systems described herein may add an audio clip supplied by trail initiator 702 to the visual media work after receiving the visual media work. In some embodiments, the systems described herein may add the audio clip such that the animated doodle face appears to be uttering the audio clip. Upon receiving the initial visual media work, the systems described herein may store the visual media work in a digital container associated with the doodle face trail.

At step 726, the systems described herein may present, to a user 710 on a mobile device 712, a trail consumption interface of a trail app. The trail consumption interface may display each previous visual media work within the trail that includes the doodle face (e.g., the visual media work created at step 724). In some embodiments, the systems described herein may then transition into enabling user 710 to create a composition that includes the doodle face, either via a portion of the trail consumption interface or via an additional creation interface. Then, at step 728, the systems described herein may receive a visual media work that includes the doodle face from user 710 via the trail app on mobile device 712. In some embodiments, the systems described herein may add an audio clip supplied by trail initiator 702 to the visual media work after receiving the visual media work and may add the composition of user 710 to the digital container.

Finally, at step 730, the systems described herein may present, to a user 714 on a mobile device 712, a trail consumption interface that displays each previous media work within the trail that includes the doodle face (e.g., the visual media works created at steps 726 and 728). In some embodiments, the systems described herein may then transition into enabling user 714 to create a composition that includes the doodle face, either within a portion of the trail consumption interface or within an additional creation interface. As described in connection with other trail modes, the systems described herein may enable additional users to add additional compositions to the doodle face trail for an indefinite period, a defined period, until a defined number of compositions have been added to the doodle face trail, and/or until trail initiator 702 closes the trail.

As mentioned above in connection with FIG. 7, the systems described herein may present a composition of a doodle face trail and/or various information relating to the doodle face trail via a user interface in a trail app. The user interface may take a variety of forms and may include a variety of content. For example, as illustrated in FIG. 8, the systems described herein may provide a user interface 800 that displays a viewer 804. Viewer 804 may display, one by one, the trail's compositions (e.g., a doodle face composition within a doodle face trail) via a mobile device 802. As shown in FIG. 8, the systems described may display, within user interface 800, a strip of thumbnails and/or links to other compositions 806 within the doodle face trail within the trail. The strip may enable a user to view past/upcoming compositions and/or to navigate between compositions that are part of the same doodle face trail (e.g., by navigating to a composition corresponding to a thumbnail selected via user input).

In some examples, other compositions 806 may be organized in a set order (e.g., the order in which the compositions were added). In one example, the systems described herein may be configured to auto-advance between other compositions 806 in the set order but may also enable a user to navigate between other compositions 806 in any order. In one embodiment, rather than adding an audio clip to each doodle face composition as the composition is received, the systems described herein may instead play an audio clip supplied by the trail initiator via viewer 804 as each doodle face composition is viewed. In some embodiments, viewer 804 may play the audio clip such that the animated doodle face appears to be uttering the audio clip.

In embodiments in which viewer 804 is displayed to a user who is eligible to add an additional composition to the doodle face trail, the display of other compositions 806 may include an interface element that launches a composition interface that enables the user to create the additional composition. In some embodiments, the launching element may take the form of, or be included as part of, a final thumbnail within the strip of thumbnails. Additionally or alternatively, the launching element may represent an element, such as button 808, that is persistently presented as each of the other compositions 806 are displayed.

In some embodiments, the systems described herein may display information 814 about the doodle face trail and/or the currently visible composition within user interface 800 (e.g., alongside viewer 804). Information 814 may include a variety of content and/or elements. In some examples, information 814 may include a list of the users who have added compositions to the doodle face trail thus far, the name of the doodle face (e.g., as supplied by the trail initiator), and/or other information about the doodle face trail. In some embodiments, the systems described herein may display a share button 810 within user interface 800 that enables the user interacting with user interface 800 to share the trail and/or an individual composition from within the trail and/or a reaction button 812 that enables the user to add a reaction (e.g., like, love, etc.) to the trail and/or the composition currently presented (e.g., viewer 804).

Moving on from doodle face trails, in some embodiments, a trail mode may promote collaborative creation where each composition builds on a previous composition in the trail. In one such example, a collaborative drawing mode may facilitate the creation of a collaborative drawing trail that includes compositions from different users that are each a drawing that is a continuation of an immediately previous drawing in the trail.

Figure 9:
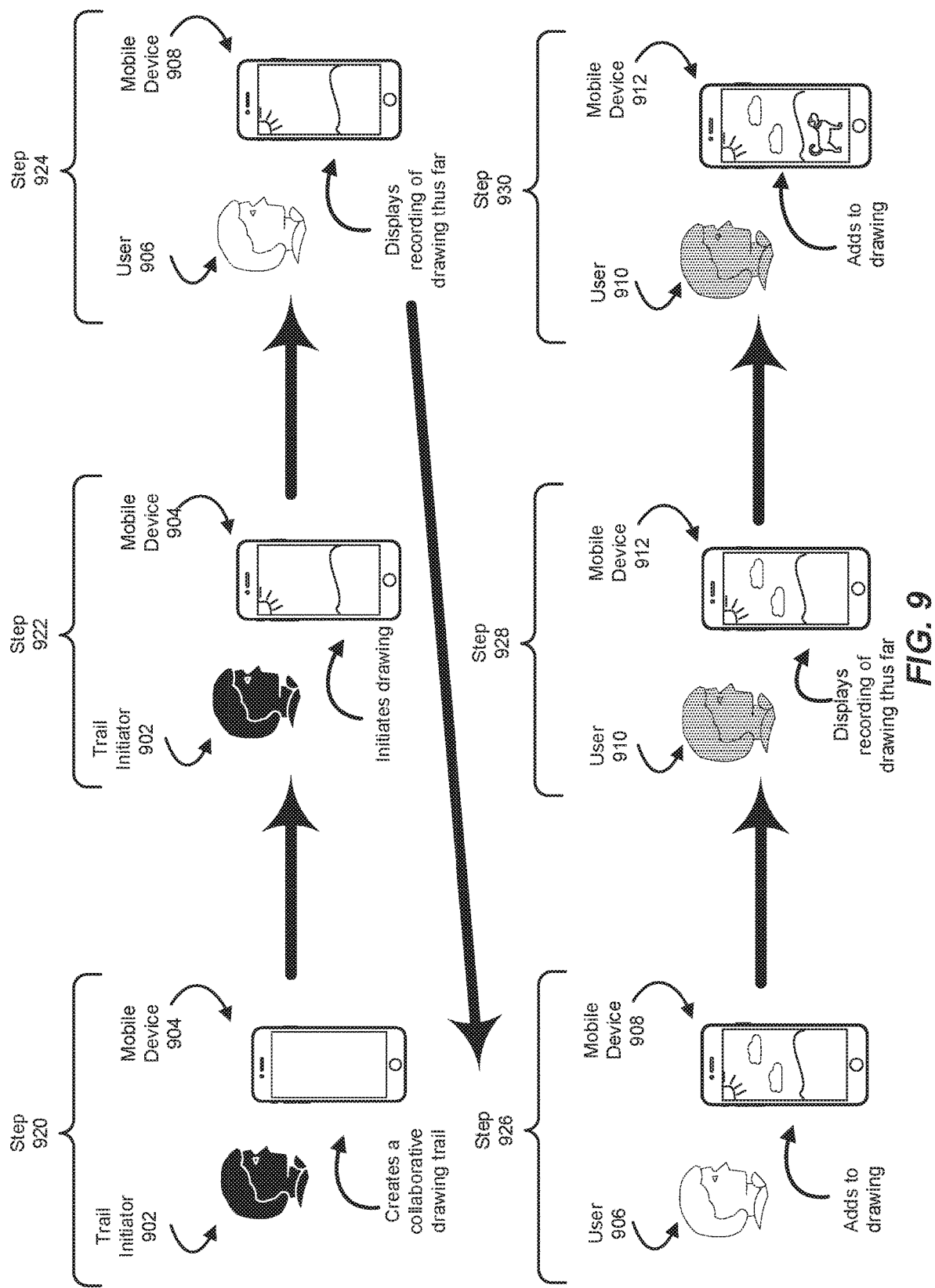
FIG. 9 is an illustration of an exemplary method for creating a collaborative drawing trail.

FIG. 9 illustrates an example method for creating a collaborative drawing trail. At step 920, a trail creation interface may, in response to receiving input from a trail initiator 902 via a mobile device 904 (e.g., via a trail app), create a new collaborative drawing trail. In some embodiments, the trail creation interface may present trail initiator 902 with an image editing tool that enables trail initiator 902 to draw (e.g., on a blank digital canvas). Additionally or alternatively, the trail app may transition to a trail composition interface that includes an image editing tool.

At step 922, the systems described herein may, via a trail app on mobile device 904, receive a drawing from trail initiator 902 (e.g., via an image editing tool that is part of the trail app). In some embodiments, the systems described herein may add the drawing to a digital container for the collaborative drawing trail. Additionally or alternatively, the systems described herein may record trail initiator 902 creating the drawing and/or may save a video of trail initiator 902 creating the drawing.

At step 924, the systems described herein may present the first drawing to a user 906 via a trail consumption interface of a trail app on a mobile device 908. In one embodiment, the systems described herein may present a video of the drawing being created (e.g., by playing a recording of trail initiator 902 creating the drawing). In some embodiments, the systems described herein may display, via a trail consumption interface provided by the trail app on mobile device 908, the initial drawing and may then transition into enabling user 906 to add to the initial drawing, either within a portion of the trail consumption interface or within an additional creation interface. In some examples, the systems described herein may provide a reply element within the trail consumption interface that triggers this transition when selected via user input.

Then (e.g., in response to receiving user input from user 906 selecting a reply element), the systems described herein may receive a drawing from user 906 via the trail app on mobile device 908 (step 926). For example, the systems described herein may present user 906 with an image editing tool that includes the initial drawing and enables user 906 to add to the drawing and/or records user 906 adding to the drawing. In some embodiments, the systems described herein may only enable each user (e.g., user 906) to access the image editing tool for a limited period of time when creating and/or adding to the trail drawing (e.g., 10 seconds, 30 seconds, one minute, two minutes, etc.). This period may be platform-specified or specified by trail initiator 902 when initiating the collaborative drawing trail. Upon receiving a drawing from user 906, the systems described herein may add the drawing from user 906 to the digital trail container created for the collaborative drawing trail.

At step 928, the systems described herein may, via a trail consumption interface of a trail app on a mobile device 912, present to a user 910 the first and second drawings. In some embodiments, the trail app may present the first and second drawings by presenting a video of the first drawing being created that transitions (e.g., seamlessly) into a video of the second drawing being added on to the first drawing. After transitioning to enabling user 910 to add a drawing, at step 930, the trail app on mobile device 912 may receive a drawing created by user 910 that adds on to the second drawing (supplied by user 906) and may add the drawing to the digital trail container.

Figure 10:
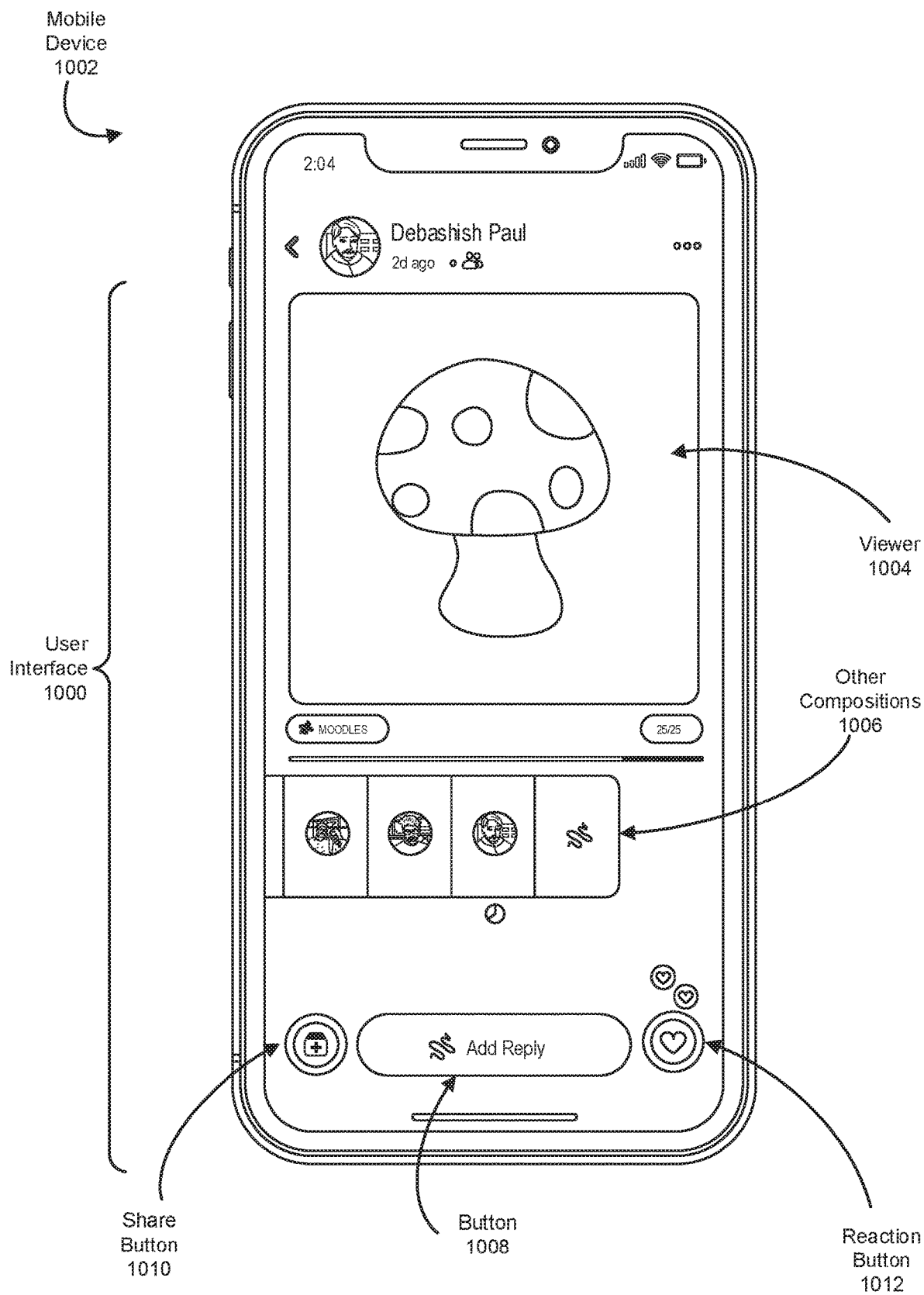
FIG. 10 is an illustration of an exemplary user interface for creating a collaborative drawing trail.

In some embodiments, the systems described herein may present the compositions of a collaborative drawing trail and/or various information about the compositions via a user interface in a trail app. For example, as illustrated in FIG. 10, the systems described herein may provide a user interface 1000 that displays a viewer 1004. Viewer 1004 may display, one by one, the trail's compositions (e.g., a collaborative drawing composition within a collaborative drawing trail) via a mobile device 1002. In one embodiment, viewer 1004 may display the compositions as a seamless video showing the progression of the trail's drawing.

As shown in FIG. 10, the systems described may display, within user interface 1000, a strip of thumbnails and/or links to other compositions 1006 within the collaborative drawing trail within the trail, which may enable a user to view past/upcoming compositions and/or to navigate between compositions that are part of the same collaborative drawing trail (e.g., by navigating to a composition corresponding to a thumbnail selected via user input). In one embodiment, the thumbnails representing other compositions 1006 may include an icon and/or avatar representing the user who created the composition rather than including an image of the composition.

In some examples, other compositions 1006 may be organized in a set order (e.g., the order in which the compositions were added). In one example, the systems described herein may be configured to auto-advance between other compositions 1006 in the set order but may also enable a user to navigate between other compositions 1006 in any order. In some embodiments, the systems described herein may advance between compositions in the collaborative drawing trail such that viewer 1004 displays a complete recording, in order, of the creation of the drawing.

In embodiments in which viewer 1004 is displayed to a user who is eligible to add an additional composition to the collaborative drawing trail, the display of other compositions 1006 may include an interface element that launches a composition interface that enables the user to create the additional composition. In some embodiments, the launching element may take the form of, or be included as part of, a final thumbnail within the strip of thumbnails. Additionally or alternatively, the launching element may represent an element, such as button 1008, that is persistently presented as each of the other compositions 1006 are displayed. In some embodiments, the systems described herein may display a share button 1010 within user interface 1000 that enables the user interacting with user interface 1000 to share the trail and/or an individual composition from within the trail and/or a reaction button 1012 that enables the user to add a reaction (e.g., like, love, etc.) to the trail and/or the composition currently presented (e.g., viewer 1004).

Moving on from collaborative creation modes, in some embodiments, the systems described herein may facilitate the creation of challenge trail that includes original compositions created by users in response to a prompt and/or theme selected and/or supplied by a trail initiator. As a specific example, a photo challenge mode may facilitate the creation of a photo challenge trail that includes compositions that are photographs taken by users in response to a challenge from the trail initiator.

Figure 11:
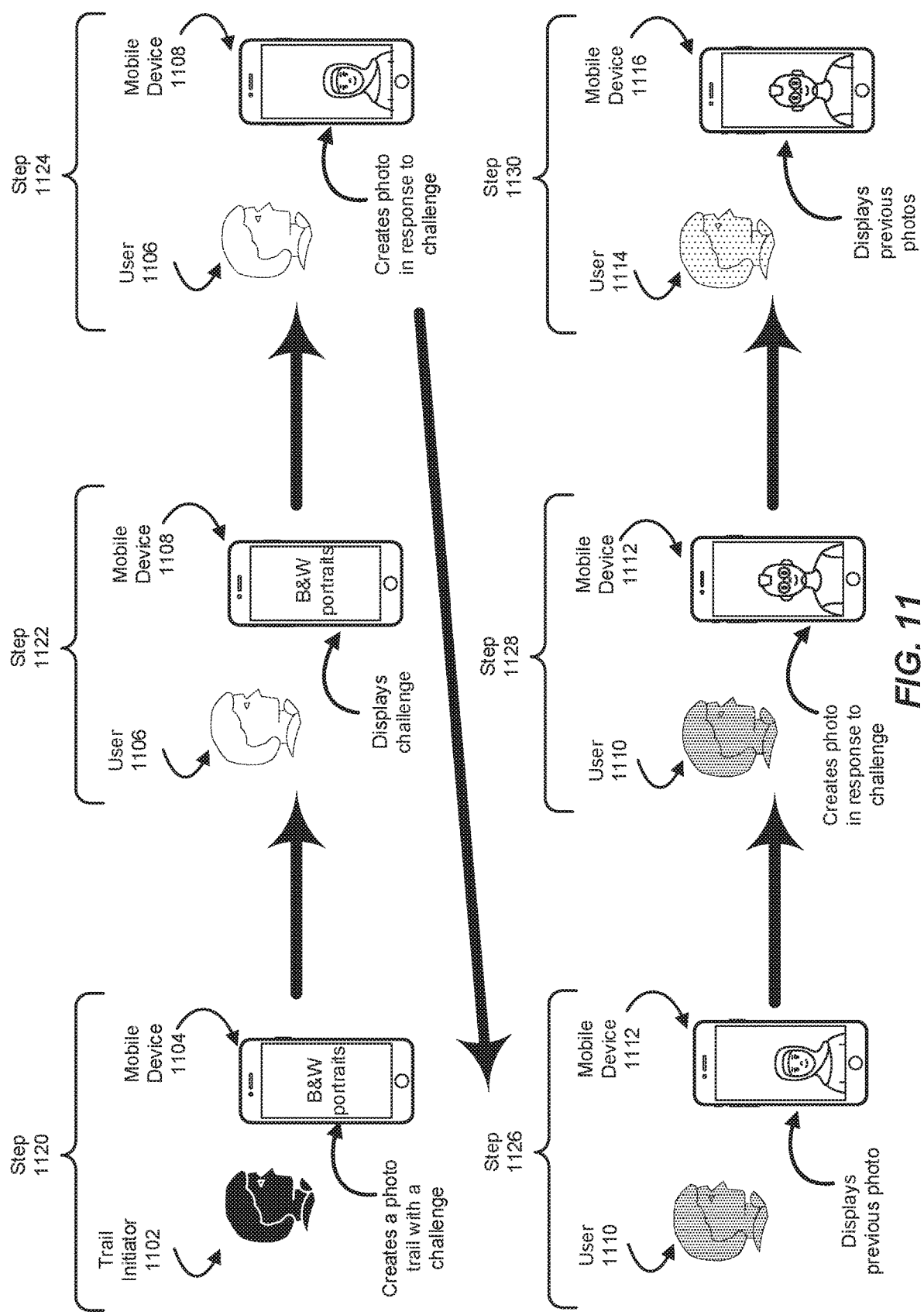
FIG. 11 is an illustration of an exemplary method for creating a photo challenge trail.

FIG. 11 illustrates an example method for creating a photo challenge trail. At step 1120, the systems described here may receive user input from a trail initiator 1102 (e.g., a first user), via a mobile device 1104, creating (i.e., initiating) a new photo challenge trail. In response to receiving the selection of the photo challenge mode, the systems described herein may then present an interface specific to the photo challenge mode that enables trail initiator 1102 to specify a challenge (e.g., a challenge to provide a portrait). In some embodiments, the interface may present a list of trail challenges that may be selected via user input. Additionally or alternatively, the systems described herein may enable trail initiator 1102 to type a challenge and/or otherwise provide a challenge.

In some embodiments, the systems described herein may also enable and/or require trail initiator 1102 to specify a constraint and/or digital transformation for the photo challenge trail. For example, the systems described herein may prompt trail initiator 1102 to specify a technical constraint on the type of compositions (e.g., only still images) and/or a digital transformation to be applied to compositions (e.g., transform images to black-and-white). Once the systems described herein have received the user input initiating the new photo challenge trail, the systems may create a digital container for the initiated photo challenge trail. In one embodiment (not depicted in FIG. 11), the systems described herein may also enable and/or require trail initiator 1102 to create an initial composition that responds to the challenge.

At step 1122, a trail platform and/or application may present, to a user 1106 (e.g., a second user), the challenge posed by trail initiator 1102 via a mobile device 1108. In some embodiments, the systems described herein may display, via a trail interface provided by a trail app on mobile device 1108, the challenge, and may then transition into enabling user 1106 to supply a composition that responds to the challenge (e.g., a portrait of user 1106), either within a portion of the trail consumption interface or within an additional creation interface. At step 1124, the systems described herein may prompt user 1106 to answer the challenge with a visual media work and enable user 1106 to supply (e.g., upload) content (e.g., a digital photograph) for a composition via the trail app. In one embodiment, the systems described herein may enable user 1106 to take a photo (e.g., via a camera of mobile device 1108). Then, the systems described herein may apply any transformations indicated by trail initiator 1102 (e.g., a black and white filter) and add this composition to the digital trail container for the trail.

At step 1126, the systems described herein may, via a trail app on a mobile device 1112, present the challenge supplied by trail initiator 1102 to a user 1110 (e.g., a third user). In some examples, the systems described herein may also present (e.g., via a trail consumption interface on mobile device 1112) the compositions previously added to the photo challenge trail (e.g., the composition created by user 1106). Then, at step 1128, a trail interface (e.g., the trail consumption interface and/or a trail composition interface) may, via mobile device 1112, prompt user 1110 to create a composition, receive a visual media work from user 1110 that responds to the challenge, and add the visual media work to the digital trail container.

Finally, at step 1130, the systems described herein may, via a trail app on a mobile device 1116, present the challenge supplied by trail initiator 1102 and/or any of the previous compositions in the photo challenge trail to a user 1114 (e.g., a fourth user). In some examples, trail composition interface may, via mobile device 1116, prompt user 1114 to answer the challenge, receive a visual media work from user 1114 in response to the challenge, and add the visual media work to the digital trail container. Following step 1130, the trail platform and/or application may, in some examples, enable trail initiator 1102, user 1106, user 1110, user 1114, and/or an additional user to then view the visual media works that answer the challenge and/or add additional visual media works. In some embodiments, the trail interface may be configured such that each user may only add one composition to the photo challenge trail. Alternatively, the trail interface may be configured such that any user may add more than one composition. In some embodiments, the trail interface may be configured such that no user can add immediately adjacent compositions to the trail.

Figure 12:
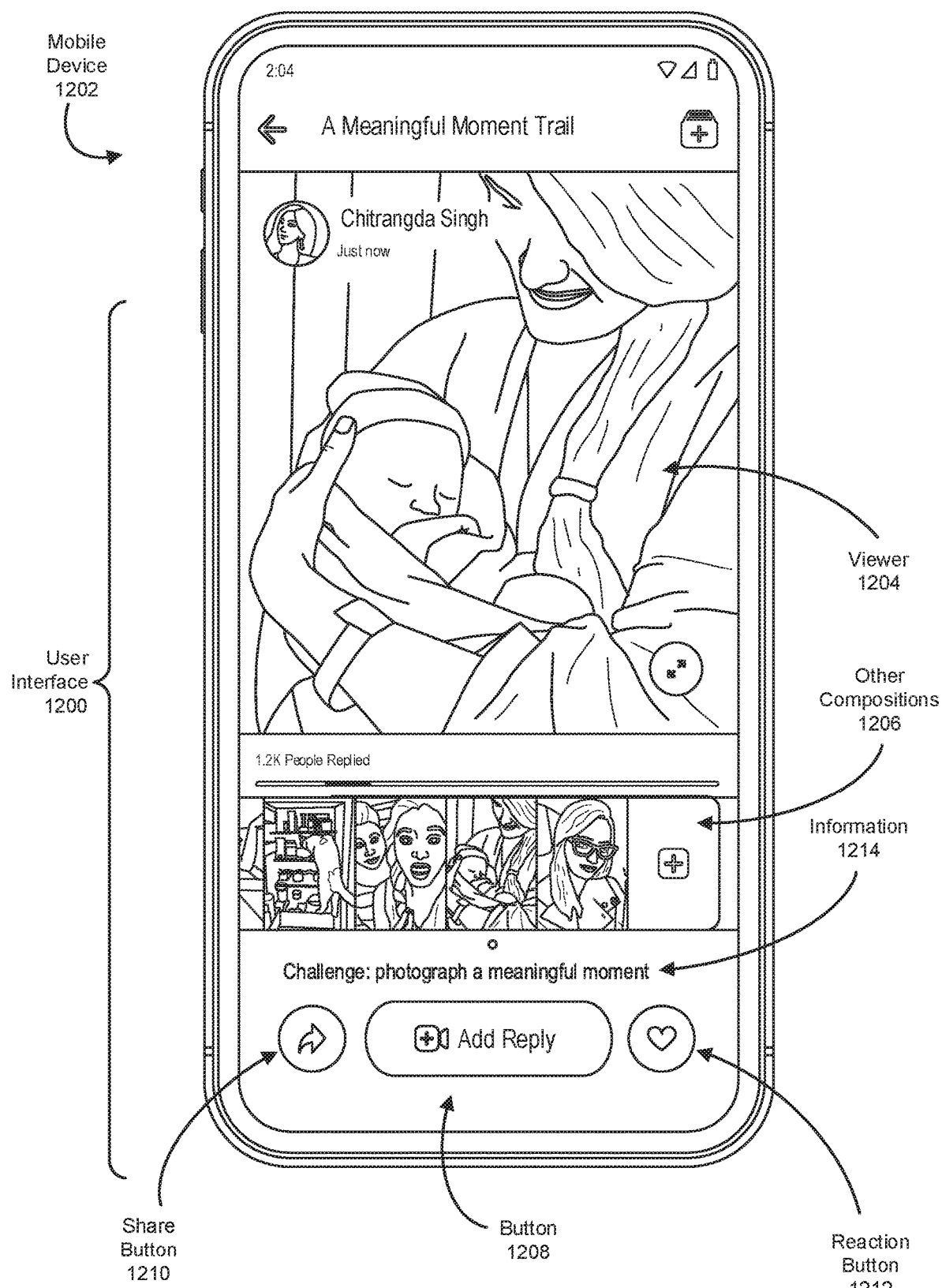
FIG. 12 is an illustration of an exemplary user interface for creating a photo challenge trail.

As mentioned above, in some embodiments, the systems described herein may present a composition and/or various information about a composition for a photo challenge trail via a user interface in a trail app. The user interface may take a variety of forms and may include a variety of content. For example, as illustrated in FIG. 12, the systems described herein may provide a user interface 1200 that displays a viewer 1204. Viewer 1204 may display, one by one, the trail's compositions (e.g., an image that answers a challenge in a photo challenge trail). As shown in FIG. 12, in some embodiments, the systems described may display, within user interface 1200, a strip of thumbnails and/or links to other compositions 1206 within the trail. The strip may enable a user to view past/upcoming compositions and/or to navigate between compositions that are part of the same photo challenge trail (e.g., by navigating to a composition corresponding to a thumbnail selected via user input). In some examples, other compositions 1206 may be organized in a set order (e.g., the order in which the compositions were added). In one example, the systems described herein may be configured to auto-advance between other compositions 1206 in the set order but may also enable a user to navigate between other compositions 1206 in any order.

In some embodiments, the systems described herein may display information 1214 about the trail and/or the composition currently displayed within viewer 1204 within user interface 1200 (e.g., alongside viewer 1204). Information 1214 may include a variety of content and/or elements. For example, information 1214 may include a creation prompt for the composition, such as the challenge for the photo challenge trail.

In embodiments in which viewer 1204 is displayed via the user account of a viewer who is eligible to add an additional composition to the trail, user interface 1200 may include (e.g., within the display of other compositions 1206) an interface element that launches a composition interface that enables the viewer to create a composition within the photo challenge trail. In some embodiments, the launching element may take the form of, or be included as part of, a final thumbnail within the strip of thumbnails. Additionally or alternatively, the launching element may represent an element, such as button 1208, that is persistently presented as each of the other compositions 1206 is displayed. Additionally or alternatively, the systems described herein may display a share button 1210 within user interface 1200 that enables the viewer to share the trail and/or an individual composition from within the trail. In one embodiment, the systems described herein may display a reaction button 1212 within user interface 1200 that enables the viewer to add a reaction (e.g., like, love, etc.) to the trail and/or the composition currently presented (e.g., via viewer 1204).

As described above, the systems and methods described herein may facilitate the creation of various types of digital trails that each contain visual media works. In some examples, a digital trail may be a collaborative creation trail, such as a collaborative drawing trail where users create a drawing together by building on a previous drawing. In other examples, a digital trail may challenge users to answer a question or respond to a theme, such as a question-and-answer trail or a photo challenge trail. In one example, a trail may form a digital conversation between users, such as an animation response trail. In another example, all compositions in a trail may contain the same element, such as a doodle face trail. In some examples, a digital trail may be completed after a limited number of compositions. In other examples, a digital trail may accept new compositions for an indefinite period. In some embodiments, a digital trail interface may enable users to both view previously recorded media items in a trail and record new media items for the trail within the same interface.

EXAMPLE EMBODIMENTS

Example 1: A computer-implemented method may include (i) receiving user input initiating a digital trail, the user input including a selection of a trail mode from a list of candidate modes, (ii) creating a digital trail container configured to contain a series of thematically related visual media works generated by users invited to contribute to the digital trail, (iii) providing, to one or more users, a creation prompt that corresponds to the trail mode, (iv) adding, to the digital trail container, at least one visual media work received in response to providing the creation prompt, and (v) displaying the resulting digital trail by sequentially presenting each visual media work added to the digital trail container in the order added.

Example 2: The computer-implemented method of example 1, where the at least one visual media work includes a digital image created by the one or more users.

Example 3: The computer-implemented method of examples 1-2, where providing, to the one or more users, the creation prompt that corresponds to the trail mode includes at least one of providing the creation prompt to a user initiating the digital trail as part of a trail initiation process or providing the creation prompt to a user immediately after sequentially presenting, as part of a consumption process, each visual media work already added to the digital trail container in the order added.

Examples 4: The computer-implemented method of examples 1-3, where the trail mode includes a digital transformation to be applied to each visual media work added to the digital trail container and adding, to the digital trail container, the at least one visual media work received in response to providing the creation prompt includes applying the digital transformation to the at least one visual media work.

Example 5: The computer-implemented method of examples 1-4, where the trail mode includes a question mode that facilitates creation of a question-and-answer trail in which each visual media work responds to a question and includes a constraint chosen by a trail-initiator user.

Example 6: The computer-implemented method of examples 1-5, where the constraint includes at least one of, a type of media of the visual work, an augmented reality element to be included in the visual work, or a digital transformation to be applied to the visual work.

Example 7: The computer-implemented method of examples 1-6, where receiving the user input initiating the digital trail includes (1) receiving the selection of the question mode from the list of candidate modes, (2) in response to receiving the selection of the question mode, presenting the trail-initiator user, via a trail creation interface, with a prepopulated list of questions, and (3) receiving, from the trail-initiator user, via the trail creation interface, a selection of the question from the prepopulated list of questions.

Example 8: The computer-implemented method of examples 1-7, where the trail mode includes an animation mode that facilitates the creation of an animation response trail in which each visual media work is an animation selected from a set of pre-existing animations that responds to an immediately previous animation in the animation response trail.

Example 9: The computer-implemented method of examples 1-8, where the trail mode includes a doodle mode that facilitates the creation of a doodle face trail in which each visual media work includes a doodle selected by a trail-initiator user.

Example 10: The computer-implemented method of examples 1-9, where receiving the user input initiating the digital trail includes (1) receiving the selection of the doodle mode, (2) presenting the trail-initiator user, via a trail creation interface, with an image editing tool that enables the trail-initiator user to draw the doodle, and (3) receiving, from the trail-initiator user, via the image editing tool within the trail creation interface, the doodle.

Example 11: The computer-implemented method of examples 1-10, where receiving the user input initiating the digital trail includes (1) receiving the selection of the doodle mode, (2) in response to receiving the selection of the doodle mode, presenting the trail-initiator user, via a trail creation interface, with a prepopulated list of doodles, (3) receiving, from the trail-initiator user, via the trail creation interface, a selection of the doodle from the prepopulated list of doodles.

Example 12: The computer-implemented method of examples 1-11, where providing, to the one or more users, the creation prompt that corresponds to the trail mode includes displaying the doodle within an image editing tool that enables a user to place the doodle at a location of the user's choice on an image selected or supplied by the user.

Example 13: The computer-implemented method of examples 1-12, where receiving the user input initiating the digital trail includes receiving an audio clip selected or supplied by the trail-initiator user and displaying the resulting digital trail by sequentially presenting each visual media work includes playing the audio clip as each visual media work is presented.

Example 14: The computer-implemented method of examples 1-13, where (1) the doodle includes an animated doodle face, (2) each visual media work includes the animated doodle face superimposed over a different image, and (3) displaying the resulting digital trail by sequentially presenting each visual media work includes playing an audio clip selected by the trail-initiator user as each visual media work is presented such that the animated doodle face appears to be uttering the audio clip.

Example 15: The computer-implemented method of examples 1-14, where the trail mode includes a group drawing mode that facilitates the creation of a collaborative drawing trail in which each visual media work includes a recording of a user adding visual content to an immediately previous visual media work in the collaborative drawing trail.

Example 16: The computer-implemented method of examples 1-15, where receiving the user input initiating the digital trail includes receiving an initial visual media work that includes a recording of a trail-initiator user adding visual content to a blank image.

Example 17: The computer-implemented method of examples 1-16, where providing, to the one or more users, the creation prompt that corresponds to the trail mode includes providing, to a user, an image editing tool that enables the user to, during a limited window of time that begins when the user opens the image editing tool, add visual content to an immediately previous visual media work in the collaborative drawing trail.

Example 18: The computer-implemented method of examples 1-17, where the trail mode includes a photo challenge mode that facilitates the creation of a photo challenge trail in which each visual media work includes a still image created by a user according to a theme specified via the creation prompt.

Example 19: A system for implementing the above-described method may include at least one physical processor and physical memory that includes computer-executable instructions that, when executed by the physical processor, cause the physical processor to (i) receive user input initiating a digital trail, the user input including a selection of a trail mode from a list of candidate modes, (ii) create a digital trail container configured to contain a series of thematically-related visual media works generated by users invited to contribute to the digital trail, (iii) provide, to one or more users, a creation prompt that corresponds to the trail mode, (iv) add, to the digital trail container, at least one visual media work received in response to providing the creation prompt, and (v) display the resulting digital trail by sequentially presenting each visual media work added to the digital trail container in the order added.

Example 20: A non-transitory computer-readable medium may include one or more computer-readable instructions that, when executed by at least one processor of a computing device, cause the computing device to (i) receive user input initiating a digital trail, the user input including a selection of a trail mode from a list of candidate modes, (ii) create a digital trail container configured to contain a series of thematically-related visual media works generated by users invited to contribute to the digital trail, (iii) provide, to one or more users, a creation prompt that corresponds to the trail mode, (iv) add, to the digital trail container, at least one visual media work received in response to providing the creation prompt, and (v) display the resulting digital trail by sequentially presenting each visual media work added to the digital trail container in the order added.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    creating a digital trail container configured to contain a series of thematically related visual media works generated by users of a social media service invited to contribute to a digital trail corresponding to the digital trail container;
    providing, to one or more users, a creation prompt that corresponds to the digital trail and adding, to the digital trail container, at least one visual media work received in response to providing the creation prompt;
    posting a resulting digital trail to a status-broadcasting platform of the social media service, wherein the posted digital trail is configured to sequentially present each visual media work added to the digital trail container in the order added;
    enabling new visual media works to be added to the posted digital trail as long as the posted digital trail has not been removed from the status-broadcasting platform; and
    each time a new visual media work is added to the posted digital trail, updating the posted digital trail to include the new visual media work.

2. The computer-implemented method of claim 1, wherein the at least one visual media work comprises a digital image created by the one or more users.

3. The computer-implemented method of claim 1, wherein providing the creation prompt; to the one or more users comprises at least one of:
    providing the creation prompt to a user initiating the digital trail as part of a trail initiation process; or
    providing the creation prompt to a user immediately after sequentially presenting, via the status-broadcasting platform, each visual media work already added to the digital trail container in the order added.

4. The computer-implemented method of claim 1, wherein:
    adding, to the digital trail container, the at least one visual media work received in response to providing the creation prompt comprises applying a digital transformation, selected as part of a trail initiation process, to the at least one visual media work.

5. The computer-implemented method of claim 1, further comprising, prior to creating the digital trail container, receiving user input initiating the digital trail, the user input comprising a selection of a trail mode from a list of candidate trail modes, wherein the selected trail mode comprises a question mode that facilitates creation of a question-and-answer trail in which each visual media work responds to a question and comprises a constraint chosen by a trail-initiator user.

6. The computer-implemented method of claim 5, wherein the constraint comprises at least one of:
    a type of media of the visual work;
    an augmented reality element to be included in the visual work; or
    a digital transformation to be applied to the visual work.

7. The computer-implemented method of claim 5, wherein receiving the user input initiating the digital trail comprises:
    receiving the selection of the question mode from the list of candidate modes;
    in response to receiving the selection of the question mode, presenting the trail-initiator user, via a trail creation interface, with a prepopulated list of questions; and
    receiving, from the trail-initiator user, via the trail creation interface, a selection of the question from the prepopulated list of questions.

8. The computer-implemented method of claim 1, further comprising, prior to creating the digital trail container, receiving user input initiating the digital trail, the user input comprising a selection of a trail mode from a list of candidate trail modes, wherein the trail mode comprises an animation mode that facilitates the creation of an animation response trail in which each visual media work is an animation selected from a set of pre-existing animations that responds to an immediately previous animation in the animation response trail.

9. The computer-implemented method of claim 1, further comprising, prior to creating the digital trail container, receiving user input initiating the digital trail, the user input comprising a selection of a trail mode from a list of candidate trail modes, wherein the trail mode comprises a doodle mode that facilitates the creation of a doodle face trail in which each visual media work comprises a doodle selected by a trail-initiator user.

10. The computer-implemented method of claim 9, wherein receiving the user input initiating the digital trail comprises:
    receiving the selection of the doodle mode;
    presenting the trail-initiator user, via a trail creation interface, with an image editing tool that enables the trail-initiator user to draw the doodle; and
    receiving, from the trail-initiator user, via the image editing tool within the trail creation interface, the doodle.

11. The computer-implemented method of claim 9, wherein providing the creation prompt to the one or more users comprises displaying the doodle within an image editing tool that enables a user to place the doodle at a location of the user's choice on an image selected or supplied by the user.

12. The computer-implemented method of claim 9, wherein receiving the user input initiating the digital trail comprises:
    receiving the selection of the doodle mode;
    in response to receiving the selection of the doodle mode, presenting the trail-initiator user, via a trail creation interface, with a prepopulated list of doodles; and
    receiving, from the trail-initiator user, via the trail creation interface, a selection of the doodle from the prepopulated list of doodles.

13. The computer-implemented method of claim 9, wherein:

receiving the user input initiating the digital trail comprises receiving an audio clip selected or supplied by the trail-initiator user; and sequentially presenting each visual media work comprises playing the audio clip as each visual media work is presented.

14. The computer-implemented method of claim 9, wherein:

the doodle comprises an animated doodle face;

each visual media work comprises the animated doodle face superimposed over a different image; and sequentially presenting each visual media work comprises playing an audio clip selected by the trail-initiator user as each visual media work is presented such that the animated doodle face appears to be uttering the audio clip.

15. The computer-implemented method of claim 1, further comprising, prior to creating the digital trail container, receiving user input initiating the digital trail, the user input comprising a selection of a trail mode from a list of candidate trail modes, wherein the trail mode comprises a group drawing mode that facilitates the creation of a collaborative drawing trail in which each visual media work comprises a recording of a user adding visual content to an immediately previous visual media work in the collaborative drawing trail.

16. The computer-implemented method of claim 15, wherein receiving the user input initiating the digital trail comprises receiving an initial visual media work that comprises a recording of a trail-initiator user adding visual content to a blank image.

17. The computer-implemented method of claim 15, wherein providing the creation prompt to the one or more users comprises providing, to a user, an image editing tool that enables the user to, during a limited window of time that begins when the user opens the image editing tool, add visual content to an immediately previous visual media work in the collaborative drawing trail.

18. The computer-implemented method of claim 1, further comprising, prior to creating the digital trail container, receiving user input initiating the digital trail, the user input comprising a selection of a trail mode from a list of candidate trail modes, wherein the trail mode comprises a photo challenge mode that facilitates the creation of a photo challenge trail in which each visual media work comprises a still image created by a user according to a theme specified via the creation prompt.

19. A system comprising:

at least one physical processor;

physical memory comprising computer-executable instructions that, when executed by the physical processor, cause the physical processor to:

create a digital trail container configured to contain a series of thematically-related visual media works generated by users of a social media service invited to contribute to a digital trail corresponding to the digital trail container;

provide, to one or more users, a creation prompt that corresponds to the digital trail and add, to the digital trail container, at least one visual media work received in response to providing the creation prompt;

post a resulting digital trail to a status-broadcasting platform of the social media service, wherein the posted digital trail is configured to sequentially present each visual media work added to the digital trail container in the order added;

enable new visual media works to be added to the posted digital trail as long as the posted digital trail has not been removed from the status-broadcasting platform; and each time a new visual media work is added to the posted digital trail, update the posted digital trail to include the new visual media work.

20. A non-transitory computer-readable medium comprising one or more computer-readable instructions that, when executed by at least one processor of a computing device, cause the computing device to:

create a digital trail container configured to contain a series of thematically-related visual media works generated by users of a social media service invited to contribute to a digital trail;

provide, to one or more users, a creation prompt that corresponds to the digital trail and add, to the digital trail container, at least one visual media work received in response to providing the creation prompt;

post a resulting digital trail to a status-broadcasting platform of the social media service, wherein the posted digital trail is configured to sequentially present each visual media work added to the digital trail container in the order added;

enable new visual media works to be added to the posted digital trail as long as the posted digital trail has not been removed from the status-broadcasting platform; and each time a new visual media work is added to the posted digital trail, update the posted digital trail to include the new visual media work.

\* \* \* \* \*